United States Patent
Hironaka et al.

(10) Patent No.: US 11,820,305 B2
(45) Date of Patent: Nov. 21, 2023

(54) WORKING FLUID SUPPLY SYSTEM

(71) Applicant: KYB Corporation, Tokyo (JP)

(72) Inventors: Tsuyoshi Hironaka, Kanagawa (JP); Midori Nagashima, Kanagawa (JP); Ken Tsukui, Kanagawa (JP); Kazuya Murota, Tokyo (JP)

(73) Assignee: KYB CORPORATION, Tokyo (JP)

( * ) Notice: Subject to any disclaimer, the term of this patent is extended or adjusted under 35 U.S.C. 154(b) by 8 days.

(21) Appl. No.: 17/756,861

(22) PCT Filed: Oct. 13, 2020

(86) PCT No.: PCT/JP2020/038595
§ 371 (c)(1),
(2) Date: Jun. 3, 2022

(87) PCT Pub. No.: WO2021/111739
PCT Pub. Date: Jun. 10, 2021

(65) Prior Publication Data
US 2023/0011239 A1 Jan. 12, 2023

(30) Foreign Application Priority Data
Dec. 5, 2019 (JP) ................. 2019-220614

(51) Int. Cl.
*F15B 11/17* (2006.01)
*B60R 16/08* (2006.01)
*F16H 61/66* (2006.01)

(52) U.S. Cl.
CPC .............. *B60R 16/08* (2013.01); *F15B 11/17* (2013.01); *F16H 61/66* (2013.01)

(58) Field of Classification Search
CPC ....... F15B 11/161; F15B 11/165; F15B 11/17; F15B 2211/20523; F15B 2211/20538; F15B 221/20576; F15B 2211/255
See application file for complete search history.

(56) References Cited

U.S. PATENT DOCUMENTS

| | | | | |
|---|---|---|---|---|
| 3,994,133 A * | 11/1976 | Pfeil | ....................... | F15B 11/17 91/516 |
| 8,516,811 B2 * | 8/2013 | Oka | ........................ | F15B 11/17 60/429 |
| 8,756,930 B2 * | 6/2014 | Johnson | ................ | F15B 11/162 60/452 |
| 11,415,218 B2 * | 8/2022 | Murota | .................... | F16H 61/12 |
| 11,465,461 B2 * | 10/2022 | Burkhard | ................ | F02B 63/06 |
| 11,614,102 B2 * | 3/2023 | Mueter | ................... | B60T 13/58 417/313 |
| 2022/0389944 A1 * | 12/2022 | Hironaka | ............ | F16H 57/0441 |

FOREIGN PATENT DOCUMENTS

JP    H10-266978 A    10/1998

\* cited by examiner

*Primary Examiner* — Michael Leslie
(74) *Attorney, Agent, or Firm* — Rabin & Berdo, P.C.

(57) ABSTRACT

A working fluid supply system is provided with: a first oil pump and a second oil pump driven by an engine; a switching valve configured to cause a discharge passage of the second oil pump to communicate with at least one of a supply passage and a first drain passage; and a controller configured to switch the switching valve. The controller is configured to switch the switching valve by spending a switching time that is set in accordance with a degree of pressure variation predicted to be caused in the supply passage when the switching valve is switched instantaneously.

7 Claims, 7 Drawing Sheets

WORKING FLUID SUPPLY SYSTEM

TECHNICAL FIELD

The present invention relates to a working-fluid supply system that supplies the working fluid to a fluid apparatus.

BACKGROUND ART

JPH10-266978A discloses a working-fluid supply system that is provided with: a main pump and a sub-pump each capable of supplying working fluid to a fluid apparatus by being driven by output from a driving source; and a switching valve that switches a supply target of the working fluid from the sub-pump. In this working fluid supply system, the supply target of the working fluid from the sub-pump is switched by the switching valve to the discharge side of the main pump or the suction side of the main pump.

SUMMARY OF INVENTION

In the working fluid supply system described in JPH10-266978A, when the supply target of the working fluid from the sub-pump is switched to the discharge side of the main pump, an amount of the working fluid supplied to the fluid apparatus is increased suddenly to increase a supply pressure, and thus, there is a risk in that the fluid apparatus cannot be operated stably. Similarly, when the supply target of the working fluid from the sub-pump is switched from the discharge side to the suction side of the main pump, the amount of the working fluid supplied to the fluid apparatus is decreased suddenly to reduce the supply pressure, and thus, there is a risk in that the fluid apparatus cannot be operated stably.

An object of the present invention is to suppress variation of supply pressure that is caused by switching of a supply state of working fluid to a fluid apparatus in which the working fluid is supplied from at least two pumps.

According to one aspect of the present invention, a working fluid supply system configured to supply working fluid to a fluid apparatus includes: a first pump and a second pump driven by output from a common driving source, the first pump and the second pump being capable of supplying working fluid to the fluid apparatus through a supply passage; a valve device configured to cause a discharge passage of the second pump to communicate with at least one of the supply passage and another passage different from the supply passage; and a control unit configured to change a communication state of the valve device in accordance with a required flow amount of the working fluid required by the fluid apparatus. The valve device has: a first communication state at which the discharge passage is communicated only with the supply passage; a second communication state at which the discharge passage is communicated only with the another passage; and a third communication state at which the discharge passage is communicated with the supply passage and the another passage while the first communication state is shifted to the second communication state or while the second communication state is shifted to the first communication state, and the control unit is: configured to set switching time for switching the communication state of the valve device in accordance with a degree of a pressure variation predicted to be caused in the supply passage when the communication state of the valve device is switched instantaneously from the first communication state to the second communication state or from the second communication state to the first communication state; and configured to switch the communication state of the valve device from the first communication state to the second communication state or from the second communication state to the first communication state via the third communication state by spending the set switching time.

DESCRIPTION OF EMBODIMENTS

Figure 1:
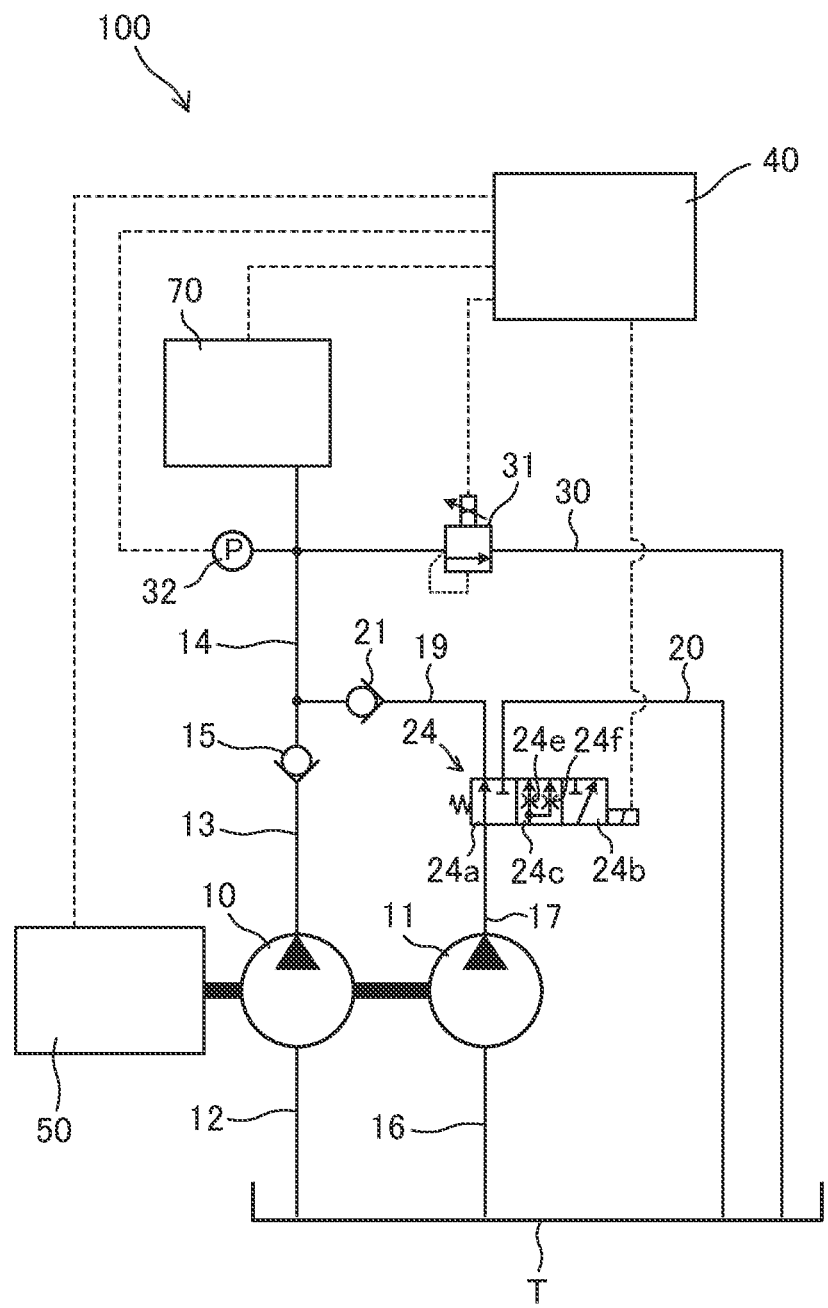
FIG. 1 is a schematic view showing a configuration of a working fluid supply system according to a first embodiment of the present invention.

Embodiments of the present invention will be described below with reference to the attached drawings.

First Embodiment

The working fluid supply system according to the first embodiment of the present invention 100 will be described with reference to FIG. 1.

A working-fluid supply system 100 is a system for supplying working fluid to a fluid apparatus that is operated with the working fluid. In the following, description will be given of a case in which the working-fluid supply system 100 is mounted on a vehicle provided with an engine 50 and an automatic transmission 70 that transmits output from the engine 50 to a driving wheel and the working-fluid supply system 100 supplies the working fluid to the automatic transmission 70 serving as the fluid apparatus having a belt type continuously variable transmission (CVT). FIG. 1 is a schematic view showing the configuration of the working-fluid supply system 100.

The working fluid supply system 100 is provided with: a first oil pump 10 serving as a first pump that is driven by the output from the engine 50 serving as a driving source and that is capable of supplying working oil serving as the working fluid to the automatic transmission 70; a second oil pump 11 serving as a second pump that is, together with the first oil pump 10, driven by the output from the engine 50 and that is capable of supplying the working oil to the automatic transmission 70; a switching valve 24 serving as a valve device that is capable of switching supply targets of the working oil from the second oil pump 11; and a controller 40 serving as a control unit that controls operation of the switching valve 24 to control the supply of the working oil to the automatic transmission 70.

The first oil pump 10 is a vane pump that is rotationally driven by the engine 50, and the first oil pump 10 sucks the working oil stored in a tank T through a first suction passage 12 and discharges the working oil to the automatic transmission 70 through a first discharge passage 13. Via a check valve 15, which allows only a flow of the working oil from the first oil pump 10 to the automatic transmission 70, the first discharge passage 13 is connected to a supply passage 14 through which the working oil to be supplied to the automatic transmission 70 flows.

Similarly to the first oil pump 10, the second oil pump 11 is the vane pump that is rotationally driven by the engine 50, and the second oil pump 11 sucks the working oil stored in the tank T through a second suction passage 16 and discharges the working oil through a second discharge passage 17 serving as a discharge passage. The second discharge passage 17 is connected to a connecting passage 19 and a first drain passage 20 via the switching valve 24. The connecting passage 19 is connected to the supply passage 14 via a check valve 21 that allows only the flow of the working oil from the second oil pump 11 to the automatic transmission 70. A second end of the first drain passage 20, whose a first end is connected to the switching valve 24, is connected to the tank T.

The first oil pump 10 and the second oil pump 11 may be two vane pumps configured separately or may be configured as a single vane pump such as a balanced vane pump having two suction regions and two discharge regions. In addition, a discharge flow amount from the first oil pump 10 and a discharge flow amount from the second oil pump 11 may be the same or different.

The switching valve 24 is an electrically driven proportional solenoid valve, and the switching valve 24 displaces a position of a spool (not shown) to cause a port to which the second discharge passage 17 is connected to communicate with at least one port of a port to which the supply passage 14 is connected via the connecting passage 19 and a port to which the first drain passage 20, serving as another passage different from the supply passage 14, is connected. The another passage different from the supply passage 14 is not limited to the first drain passage 20, and it may include, for example, a passage, which is different from the supply passage 14, through which the working oil to be supplied to the automatic transmission 70 flows and a passage through which the working oil to be supplied to a fluid apparatus different from the automatic transmission 70 flows.

Figure 2:
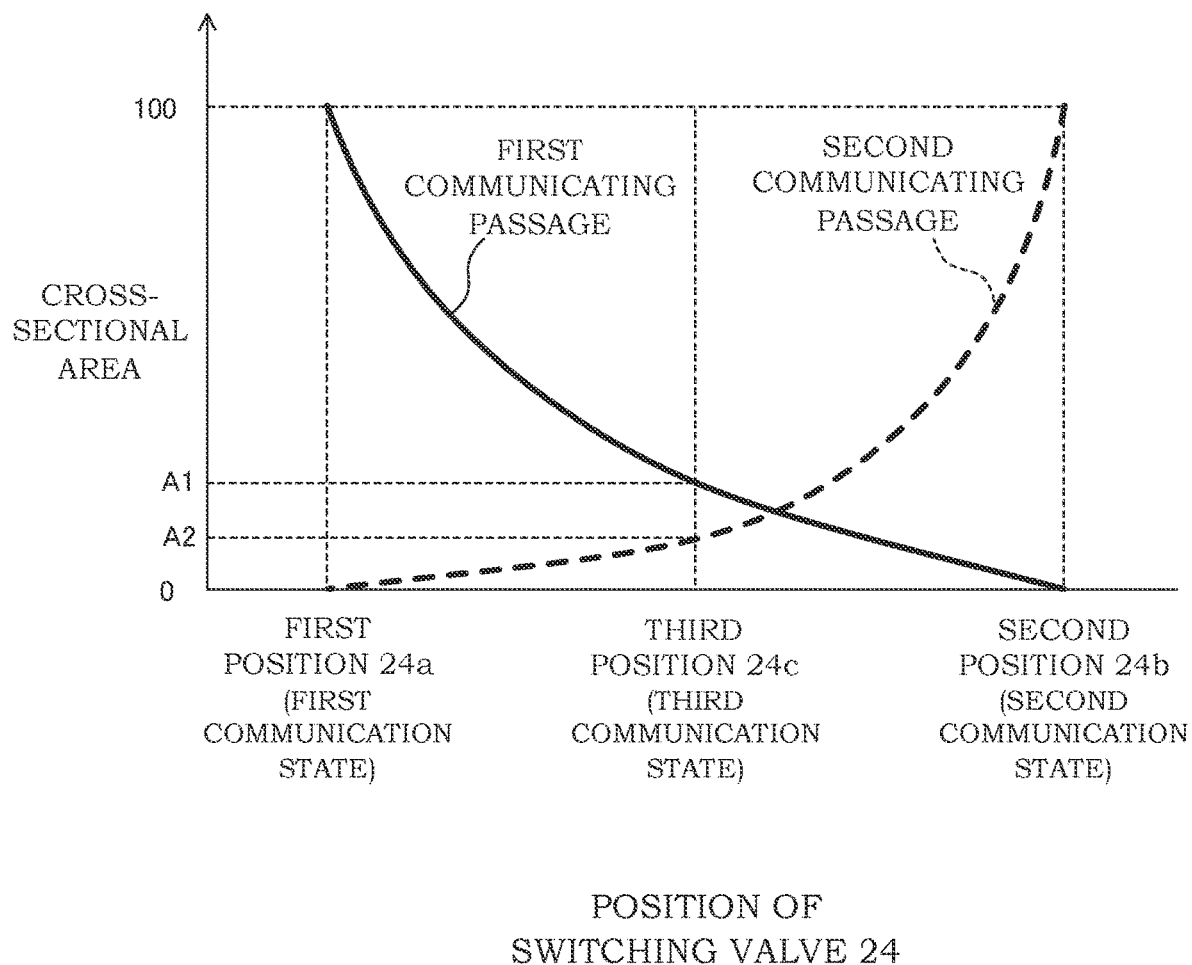
FIG. 2 is a diagram for explaining a communication state of a switching valve of the working fluid supply system according to the first embodiment of the present invention.

As shown in FIGS. 1 and 2, the switching valve 24 has three positions, i.e. a first position 24a at which the second discharge passage 17 is communicated with the supply passage 14 through the connecting passage 19; a second position 24b at which the second discharge passage 17 is communicated with the first drain passage 20; and a third position 24c, between the first position 24a and the second position 24b, at which the second discharge passage 17 is communicated with the supply passage 14 through a first restrictor 24e and the second discharge passage 17 is communicated with the first drain passage 20 through a second restrictor 24f. Although the position of the switching valve 24 is controlled by the controller 40, in order to enable the supply of the working oil from the second oil pump 11 even when the switching valve 24 is failed, it is biased so as to be set at the first position 24a when electric current is not supplied.

FIG. 2 is a diagram schematically showing how the respective sizes of the cross-sectional areas of a first communicating passage and a second communicating passage are changed in accordance with the position of the switching valve 24 in a case in which, in the switching valve 24, the passage through which the second discharge passage 17 and the connecting passage 19 are communicated is set as the first communicating passage and the passage through which the second discharge passage 17 and the first drain passage 20 are communicated is set as the second communicating passage.

As shown in FIG. 2, the cross-sectional area of the first communicating passage is set so as to be the largest at the first position 24a. The cross-sectional area is set so as to be gradually reduced as the position is shifted from the first position 24a towards the second position 24b and so as to become zero at the second position 24b, in other words, it is set such that the first communicating passage is closed at the second position 24b. On the other hand, the cross-sectional area of the second communicating passage is the largest at the second position 24b. The cross-sectional area is gradually reduced as the position is shifted from the second position 24b to the first position 24a and becomes zero at the first position 24a, in other words, it is set such that the second communicating passage is closed at the first position 24a.

As the cross-sectional area of the first communicating passage and the cross-sectional area of the second communicating passage are set as described above, at the third position 24c, the second discharge passage 17 is communicated with the connecting passage 19 through the first communicating passage, the cross-sectional area of which has become relatively small, in other words, through the first restrictor 24e, and the second discharge passage 17 is communicated with the first drain passage 20 through the second communicating passage, the cross-sectional area of which has become relatively small, in other words, through the second restrictor 24f.

In the above, in general, because the pressure in the first drain passage 20 becomes lower than the pressure in the supply passage 14, if the cross-sectional area of the first communicating passage is set so as to be the same as the cross-sectional area of the second communicating passage at the third position 24c, most of the working oil that has been discharged from the second oil pump 11 is caused to flow into the first drain passage 20.

Thus, by setting a first the cross-sectional area A1 that is the cross-sectional area of the first communicating passage at the third position 24c, in other words, the cross-sectional area of the first restrictor 24e so as to become larger than a second the cross-sectional area A2 that is the cross-sectional area of the second communicating passage, in other words, the cross-sectional area of the second restrictor 24f, a flow amount of the working oil flowing into the first drain passage 20 is prevented from becoming excessively larger than the flow amount of the working oil flowing into the supply passage 14 at the third position 24c. It is preferable that, at the third position 24c, the cross-sectional area of the first restrictor 24e and the cross-sectional area of the second restrictor 24f be set such that the flow amount of the working oil flowing into the first drain passage 20 becomes substantially the same as the flow amount of the working oil flowing into the supply passage 14.

At the third position 24c, in a case in which the passage that is connected to the second discharge passage 17 is not the first drain passage 20 that returns the working oil to the tank T, but is the passage through which the working oil to be supplied to any of the fluid apparatuses flows, as long as the pressure in this passage is substantially the same as the pressure in the supply passage 14, the first the cross-sectional area A1 and the second the cross-sectional area A2 may be set to the same size.

When the position of the switching valve 24 having the above-described configuration is switched to the first position 24a, a first communication state in which the second discharge passage 17 is communicated with the connecting passage 19, and the communication between the second discharge passage 17 and the first drain passage 20 is shut off is established. At the first communication state, the working oil that has been discharged from the second oil pump 11 is supplied to the automatic transmission 70 through the connecting passage 19 and the supply passage 14.

On the other hand, when the position of the switching valve 24 is switched to the second position 24b, a second communication state in which the second discharge passage 17 is communicated with the first drain passage 20, and the communication between the second discharge passage 17 and the connecting passage 19 is shut off is established. In the second communication state, the working oil that has been discharged from the second oil pump 11 is discharged to the tank T through the first drain passage 20.

When the position of the switching valve 24 is set at the second position 24b, a state in which both of the suction side and the discharge side of the second oil pump 11 are communicated with the tank T is established, and the pressure difference between the suction side and the discharge side of the second oil pump 11 becomes substantially zero. Therefore, the second oil pump 11 is shifted to a no-load operation state, in other words, the second oil pump 11 is shifted to a state in which the load for driving the second oil pump 11 is scarcely applied to the engine 50. Thus, in order to improve the efficiency of the working fluid supply system 100, it is preferred that the second oil pump 11 be set to the no-load operation state when the discharge of the working oil from the second oil pump 11 is not required.

In addition, when the position of the switching valve 24 is switched to the position including the third position 24c between the first position 24a and the second position 24b, a third communication state in which the second discharge passage 17 is communicated with the connecting passage 19, and the second discharge passage 17 is communicated with the first drain passage 20 is established. In the third communication state, the working oil that has been discharged from the second oil pump 11 is supplied to the automatic transmission 70 through the connecting passage 19 and the supply passage 14 and is discharged to the tank T through the first drain passage 20.

At this time, the ratio between the flow amount of the working oil flowing into the supply passage 14 and the flow amount of the working oil flowing into the first drain passage 20 is changed in accordance with the ratio between the cross-sectional area of the first communicating passage and the cross-sectional area of the second communicating passage, the pressure in the supply passage 14, and the pressure in the first drain passage 20. Because the check valve 21 is provided between the connecting passage 19 and the supply passage 14 as described above, flow out of the working oil in the supply passage 14 to the first drain passage 20 through the connecting passage 19 and the switching valve 24 is avoided.

As described above, in the working fluid supply system 100, it is possible to supply the working oil to the automatic transmission 70 also from the second oil pump 11 in addition to the first oil pump 10 if required.

The position of the switching valve 24 may be switched as the spool (not shown) is directly driven by a solenoid (not shown) or may be switched by the presence/absence and the level of the pilot pressure acting on the spool, and as a driving system of the switching valve 24, any system may be employed as long as the positions are switched in accordance with instructions from the controller 40.

The working fluid supply system 100 is further provided with a pressure control valve 31 that controls the pressure of the working oil to be supplied to the automatic transmission 70.

The pressure control valve 31 is an electromagnetic regulator appropriately discharges the working oil in the supply passage 14 to the tank T through a second drain passage 30 connected to the tank T, and the operation of the pressure control valve 31 is controlled by the controller 40 such that the pressure detected by a pressure sensor 32 capable of detecting the pressure in the supply passage 14 becomes the level set in advance. In other words, the level of the pressure of the working oil to be supplied to the automatic transmission 70 from the first oil pump 10 and the second oil pump 11 is always controlled so as to become a suitable level by the pressure control valve 31.

Figure 3:
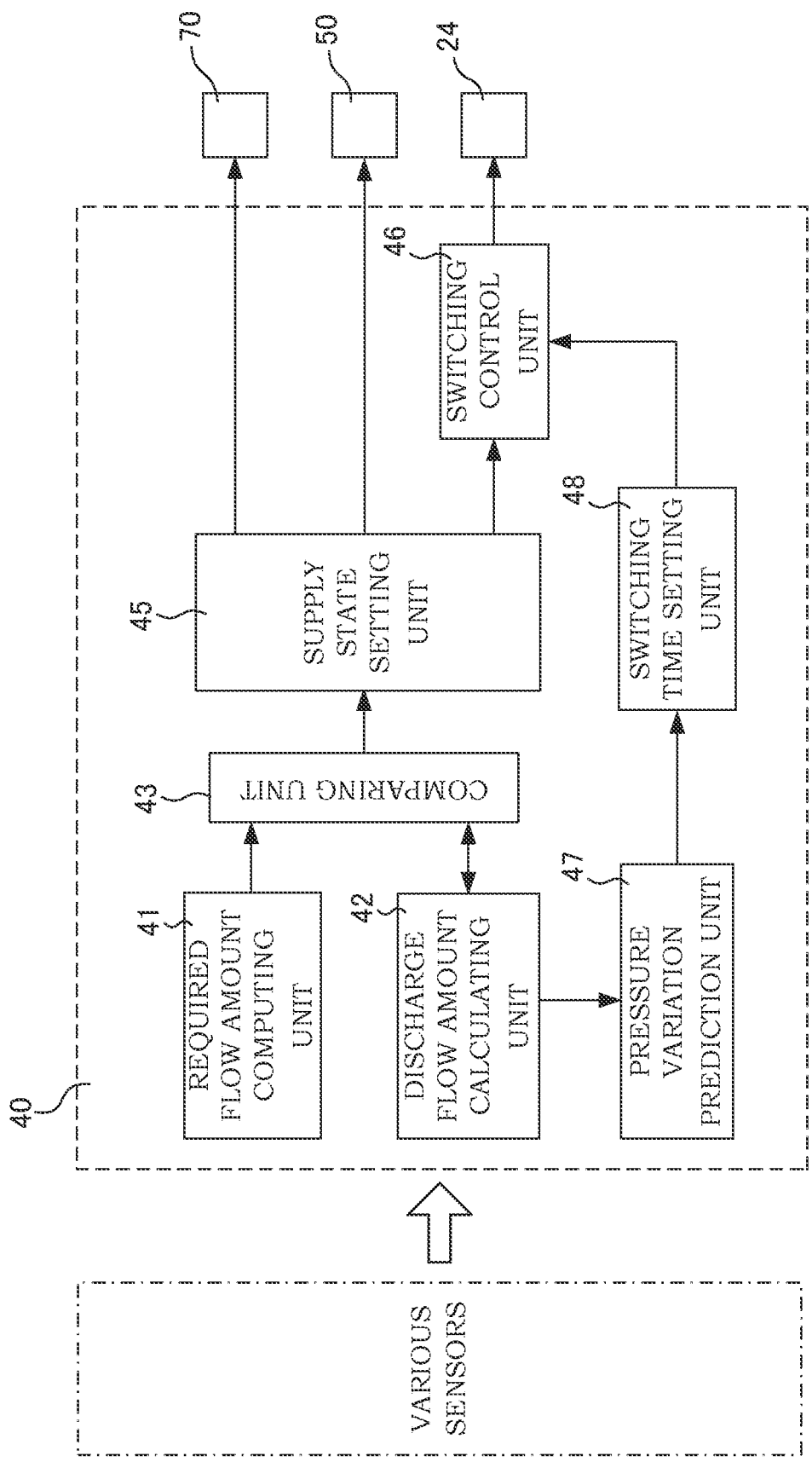
FIG. 3 is a block diagram for explaining functions of a controller of the working fluid supply system according to the first embodiment of the present invention.

Next, the controller 40 will be described with reference to FIG. 3. FIG. 3 is a block diagram for explaining functions of the controller 40.

The controller 40 is formed of a microcomputer provided with a CPU (a central processing unit), a ROM (a read only memory), a RAM (a random access memory), and an I/O interface (an input/output interface). The RAM stores data for processing executed by the CPU, the ROM pre-stores a control program, etc. for the CPU, and the I/O interface is used for input/output of information to/from devices connected to the controller 40. The controller 40 may also be formed of a plurality of microcomputers.

The controller 40 controls the supply state of the working oil to the automatic transmission 70 by controlling the switching of the position of the switching valve 24 on the basis of the signals indicating the state of the vehicle input from the various sensors that are provided at respective parts of the vehicle. The controller 40 may be configured so as to serve as both of a controller of the engine 50 and a controller of the automatic transmission 70, or it may be provided separately from the controller of the engine 50 and the controller of the automatic transmission 70.

The signals indicating the state of the vehicle to be input to the controller 40 include: for example, the signals indicating the speed of the vehicle; the signals indicating acceleration of the vehicle; the signals indicating the operating position of a shift lever; the signals indicating the operated amount of the accelerator; the signals indicating the rotation speed of the engine 50; the signals indicating the load of the engine 50 such as the throttle position, the fuel-injection amount, and so forth; the signals indicating the input shaft and output shaft rotation speeds of the automatic transmission 70; the signals indicating the oil temperature of the working oil in the automatic transmission 70; the signals indicating the pressure of the working oil (line pressure) supplied to the automatic transmission 70; the signals indicating the transmission gear ratio of the automatic transmission 70; the signals indicating the discharge pressure of the first oil pump the signals indicating the discharge pressure of the second oil pump 11; and so forth.

The controller 40 has, as the functions for controlling the supply of the working oil to the automatic transmission 70: a required flow amount computing unit 41 that computes a required flow amount Qr of the working oil required by the automatic transmission 70 on the basis of the signals that are input from the various sensors; a discharge flow amount calculating unit 42 that calculates a first discharge flow amount Q1 of the working oil discharged from the first oil pump and a second discharge flow amount Q2 of the working oil discharged from the second oil pump 11 on the basis of the signals that are input from the various sensors; a comparing unit 43 that performs comparison of the flow amount computed by the required flow amount computing unit 41 and the flow amount calculated by the discharge flow amount calculating unit 42; a supply state setting unit 45 that sets the supply state of the working oil to the automatic transmission 70 on the basis of a comparison result obtained by the comparing unit 43; and a switching control unit 46 that controls the switching of the position of the switching valve 24 in accordance with the instructions from the supply state setting unit 45. The required flow amount computing unit 41, etc. are shown as virtual units for the respective functions of the controller 40, and they do not imply that they physically exist.

The required flow amount computing unit 41 computes the flow amount of the working oil required by the automatic transmission 70 mainly on the basis of: an accelerator opening degree and a vehicle speed; the oil temperature of the working oil in the automatic transmission the pressure of the working oil supplied to the automatic transmission 70; the input shaft and output shaft rotation speed of the automatic transmission 70; and the transmission gear ratio of the automatic transmission 70.

In the above, the flow amount of the working oil required by the automatic transmission includes: a transmission flow amount required for changing a width between pulleys of a variator of the belt type continuously variable transmission (not shown); a leakage flow amount through a gap in a hydraulic control valve and a gap in a hydraulic circuit; a lubrication flow amount required for cooling or lubricating the automatic transmission 70; a cooling flow amount guided to an oil cooler (not shown); and so forth.

The extent of each of these flow amounts is mapped in advance and is stored in the ROM of the controller 40. Specifically, the transmission flow amount takes a larger value when the transmission gear ratio is changed largely, for example, at the time of acceleration at which a rate of increase of the accelerator opening degree is large and at the time of deceleration at which a rate of deceleration of the vehicle speed is large, and therefore, a rate of change of the accelerator opening degree and of the vehicle speed are used as the parameters. As the parameters related to the acceleration/deceleration of the vehicle, the throttle position, the fuel-injection amount, and so forth affecting the change in the rotation speed and the load of the engine 50 may also be used. The lower the viscosity of the working oil becomes due to the increase in the temperature of the working oil and the higher the pressure of the supplied working oil becomes, the larger the value of the leakage flow amount becomes, and therefore, the temperature and pressure of the working oil are used as the parameters.

In addition, the lower the viscosity of the working oil becomes due to the increase in the temperature of the working oil, the more likely an oil film shortage is to be caused, and therefore, the higher the temperature of the working oil is, the higher the lubrication flow amount needs to be set, and in addition, the higher a rotation speed of a rotation shaft in the automatic transmission 70 is, the more likely the oil film shortage is to be caused, and therefore, the higher the rotation speed of the rotation shaft in the automatic transmission 70 is, the higher the lubrication flow amount needs to be set. By taking these factors into consideration, for the lubrication flow amount, for example, the temperature of the working oil and the rotation speed of the input/output shaft of the automatic transmission 70 are used as the parameters.

In addition, from the view point of the lubricity, the retention of the oil film, and so forth, the temperature of the working oil needs to be kept so as not to exceed a predetermined temperature, and in addition, in order to cool the working oil, it is required to achieve a state in which cooling air is guided to the oil cooler, in other words, a state in which the vehicle is traveling at a predetermined vehicle speed or higher. Therefore, for the cooling flow amount, the temperature of the working oil and the vehicle speed are mainly used as the parameters. These parameters for determining the transmission flow amount, the leakage flow amount, the lubrication flow amount, and the cooling flow amount are only examples, and any parameters associated with the exemplified parameters may also be used, and so, selection of parameters is appropriately performed from the signals input to the controller 40 for determining the parameters.

As described above, the required flow amount computing unit 41 computes the required flow amount Qr that is an amount of the working oil required by the automatic transmission 70 per unit time by taking the transmission flow amount, the leakage flow amount, the lubrication flow amount, and the cooling flow amount into consideration.

The discharge flow amount calculating unit 42 calculates the first discharge flow amount Q1 that is the amount of the working oil discharged from the first oil pump 10 per unit time mainly on the basis of the rotation speed of the engine 50 and a preset first base discharged amount D1 that is the theoretical discharged amount per revolution of the first oil pump 10. The discharge flow amount calculating unit 42 also calculates the second discharge flow amount Q2 that is the amount of the working oil discharged from the second oil pump 11 per unit time mainly on the basis of the rotation speed of the engine 50 and a preset second base discharged amount D2 that is the theoretical discharged amount per revolution of the second oil pump 11.

The rotation speed of the first oil pump 10 and the first discharge flow amount Q1 of the first oil pump 10 are in a relationship in which they are changed substantially proportional to each other, and in addition, the first discharge flow amount Q1 of the first oil pump 10 is changed in response to the viscosity that varies with the oil temperature and the discharge pressure of the first oil pump 10. These relationships are mapped in advance in order to accurately calculate the first discharge flow amount Q1 of the first oil pump 10 and are stored in the ROM of the controller 40.

Because the rotation speed of the first oil pump 10 is changed in response to the rotation speed of the engine 50 driving the first oil pump 10, the discharge flow amount calculating unit 42 easily calculates the first discharge flow amount Q1 from the rotation speed of the engine 50, the oil temperature of the working oil, and the discharge pressure of the first oil pump 10.

The first discharge flow amount Q1 may be calculated by using the rotation speed of the first oil pump 10 instead of the rotation speed of the engine 50. In addition, because the discharge pressure of the first oil pump 10 is changed in response to the line pressure that is the pressure of the working oil supplied to the automatic transmission 70, the line pressure may also be used instead of the discharge pressure of the first oil pump 10 for the calculation of the first discharge flow amount Q1 of the first oil pump 10.

The second discharge flow amount Q2 of the second oil pump 11 is also calculated in a similar manner to the first discharge flow amount Q1 of the first oil pump 10. The calculation of the second discharge flow amount Q2 of the second oil pump 11 is performed regardless of the switched state of the switching valve 24, in other words, regardless of whether or not the second oil pump 11 is in the state in which it supplies the working oil to the automatic transmission 70.

As described below, the comparing unit 43 performs the comparison of the required flow amount Qr computed by the required flow amount computing unit 41 with the first discharge flow amount Q1 calculated by the discharge flow amount calculating unit 42 and the comparison of the total flow amount of the first discharge flow amount Q1 and the second discharge flow amount Q2 with the required flow amount Qr, and sends the signals corresponding to these comparison results to the supply state setting unit 45.

The supply state setting unit 45 sets the supply state of the working oil to the automatic transmission 70 on the basis of the signals sent from the comparing unit 43 and sends the signals to the switching control unit 46 such that thus-set supply state is achieved. Specifically, the supply state setting unit 45 sets the supply state for supplying the working oil to the automatic transmission 70 from two states: a first supply state in which the position of the switching valve 24 is switched to the second position 24b by the switching control unit 46, the working oil is not supplied to the automatic transmission 70 from the second oil pump 11, and the working oil is supplied to the automatic transmission 70 only from the first oil pump 10; and a second supply state in which the position of the switching valve 24 is switched to the first position 24a by the switching control unit 46, and the working oil is supplied to the automatic transmission 70 from two pumps: the first oil pump 10 and the second oil pump 11.

In the above, when the supply state of the working oil to the automatic transmission 70 is switched from the first supply state to the second supply state, if the position of the switching valve 24 is switched instantaneously from the second position 24b to the first position 24a, the flow amount of the working oil flowing into the supply passage 14 is suddenly increased to suddenly increase the pressure in the supply passage 14, and the control of the pressure performed by the pressure control valve 31 cannot follow the increase. Then, the pressure of the working oil to be supplied to the automatic transmission 70 is increased so as to become higher than the pressure set in advance, as a result, there is a risk in that the automatic transmission 70 cannot be operated stably.

Similarly, when the supply state of the working oil to the automatic transmission 70 is switched from the second supply state to the first supply state, if the position of the switching valve 24 is switched instantaneously from the first position 24a to the second position 24b, the flow amount of the working oil flowing into the supply passage 14 is suddenly decreased to suddenly decrease the pressure in the supply passage 14, and the pressure of the working oil to be supplied to the automatic transmission 70 becomes lower than the pressure set in advance. As a result, there is a risk in that the automatic transmission 70 cannot be operated stably.

In order to avoid the variation of the pressure in the supply passage 14 as described above, the controller 40 further has: a pressure variation prediction unit 47 that predicts variation of the pressure that will be caused in the supply passage 14 when the position of the switching valve 24 is switched instantaneously; and a switching time setting unit 48 that sets a switching time to be spent for switching the position of the switching valve 24 in accordance with the variation of pressure predicted by the pressure variation prediction unit 47.

The pressure variation prediction unit 47 predicts the variation of the pressure that will be caused in the supply passage 14 by using the map stored in advance on the basis of the first discharge flow amount Q1 of the working oil discharged from the first oil pump 10 and the second discharge flow amount Q2 of the working oil discharged from the second oil pump 11 both calculated by the discharge flow amount calculating unit 42.

For the map: the pressure in the supply passage 14, the first discharge flow amount Q1, the second discharge flow amount Q2, the engine rotation speed, the temperature of the working oil before the switching valve 24 is switched; the speed and the time spent for switching the switching valve 24; and so forth are used as the parameters, for example, and the predictions are made on how the variation of the pressure caused in the supply passage 14 will be changed when these parameters are changed, and this map is stored in the ROM of the controller 40. In the ROM of the controller 40, arithmetic expressions for computing the pressure variation by using these as the parameters may be stored instead of the map.

As described above, the variation of the pressure caused in the supply passage 14 when a state in which the flow amount of the working oil flowing through the supply passage 14 is the first discharge flow amount Q1 is changed to a state in which the second discharge flow amount Q2 is added thereto is predicted, and the variation of the pressure caused in the supply passage 14 when a state in which the flow amount of the working oil flowing through the supply passage 14 is the flow amount obtained by adding the first discharge flow amount Q1 and the second discharge flow amount Q2 is changed to a state in which the second discharge flow amount Q2 is subtracted therefrom is predicted. The larger the second discharge flow amount Q2 is, in other words, the higher the rotation speed of the engine 50 driving the second oil pump 11 is, the higher the predicted pressure variation becomes.

The switching time setting unit 48 sets the switching time for switching the position of the switching valve 24 from the first position 24a to the second position 24b or from the second position 24b to the first position 24a in accordance with the pressure variation predicted by the pressure variation prediction unit 47 as described above. Specifically, the switching time is set at a standard switching time in a case in which the pressure variation predicted by the pressure variation prediction unit 47 is so small that the operation of the automatic transmission 70 is not affected, and the switching time is set at the time obtained by adding a predetermined additional time to the standard switching time, in other words, the time longer than the standard switching time in a case in which the pressure variation predicted by the pressure variation prediction unit 47 is so large that the operation of the automatic transmission 70 is affected. A duration of the standard switching time is, for example, from 0.03 seconds to 0.07 seconds, and preferably, about 0.05 seconds.

How long the duration of the predetermined additional time should be in relation to the pressure variation is determined in advance by experiments, etc. and the obtained results are mapped, and they are stored in the ROM of the controller 40 together with the standard switching time. For the setting of the predetermined additional time, in addition to the predicted pressure variation, the pressure of the working oil acting on the spool of the switching valve 24, etc. may be taken into consideration, and arithmetic expressions for computing the predetermined additional time by using these as the parameters may be stored in the ROM of the controller 40.

The above-described switching control unit 46 then switches the position of the switching valve 24, via the third position 24c, from the first position 24a to the second position 24b or from the second position 24b to the first position 24a over the switching time that is set by the switching time setting unit 48. For example, the greater the variation of pressure predicted by the pressure variation prediction unit 47 is, the longer the switching time becomes, and the relatively slower the operation speed of the switching valve 24 becomes. As the operation speed of the switching valve 24 becomes slower as described above, the time spent for the shift of the position of the switching valve 24 to the position between the first position 24a and the second position 24b including the third position 24c, in other words, the time spent to achieve the third communication state becomes longer.

Therefore, in the course of the switching of the position of the switching valve 24 from the first position 24a to the second position 24b, the flow amount of the working oil supplied from the second oil pump 11 to the supply passage 14 is gradually reduced while the amount of the working oil discharged to the tank T through the first drain passage 20 is gradually increased. Thus, the sudden decrease in the flow amount of the working oil flowing through the supply passage 14 is avoided. Thereby, the sudden decrease in the supply pressure of the working oil supplied to the automatic transmission 70 is also avoided, and as a result, it becomes possible to operate the automatic transmission 70 stably.

Similarly, in the course of the switching of the position of the switching valve 24 from the second position 24b to the first position 24a, the flow amount of the working oil discharged to the tank T through the first drain passage 20 is gradually reduced while the flow amount of the working oil supplied from the second oil pump 11 to the supply passage 14 is gradually increased. Thus, the sudden increase in the flow amount of the working oil flowing through the supply passage 14 is avoided. Thereby, the sudden increase in the supply pressure of the working oil supplied to the automatic transmission 70 is also avoided, and as a result, it becomes possible to operate the automatic transmission 70 stably.

Figure 4:
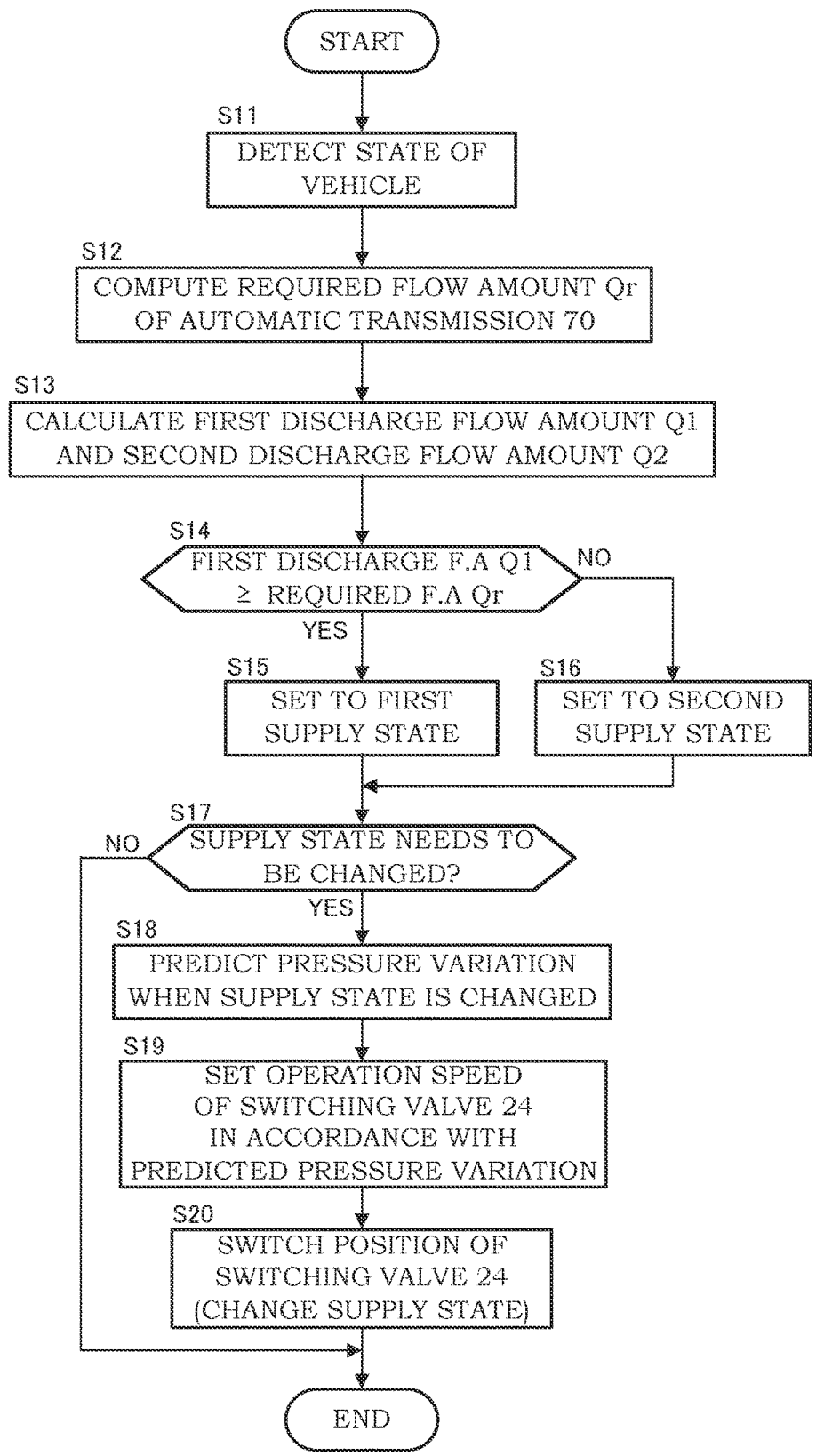
FIG. 4 is a flow chart showing a procedure of a control executed by a controller of the working fluid supply system according to the first embodiment of the present invention.

Next, a control performed by the controller 40, which has the above-described functions, at the time when the working oil is supplied to the automatic transmission 70 will be described with reference to the flow chart shown in FIG. 4. The control shown in FIG. 4 is executed repeatedly by the controller 40 at every predetermined time periods.

First, in step S11, as detection signals from the various sensors indicating the state of the vehicle, especially, the states of the engine 50 and the automatic transmission 70, for example, the signals indicating the speed of the vehicle, the signals indicating the acceleration of the vehicle, the signals indicating the operating position of the shift lever, the signals indicating the operated amount of the accelerator, the signals indicating the rotation speed of the engine 50, the signals indicating the load of the engine 50 such as the throttle position, the fuel-injection amount, and so forth, the signals indicating the input shaft and output shaft rotation speeds of the automatic transmission 70, the signals indicating the oil temperature of the working oil in the automatic transmission 70, the signals indicating the pressure of the working oil (the line pressure) supplied to the automatic transmission 70, the signals indicating the transmission gear ratio of the automatic transmission 70, the signals indicating the discharge pressure of the first oil pump 10, the signals indicating the discharge pressure of the second oil pump 11, and so forth are input to the controller 40.

In step S12, on the basis of the signals from the various sensors that are input in step S11, the required flow amount Qr of the working oil that is required by the automatic transmission 70 is computed by the required flow amount computing unit 41.

In following step S13, on the basis of the signals from the various sensors that are input in step S11, the first discharge flow amount Q1 of the working oil discharged from the first oil pump 10 and the second discharge flow amount Q2 of the working oil discharged from the second oil pump 11 are calculated by the discharge flow amount calculating unit 42. In a case in which the specification of the first oil pump 10 and the specification of the second oil pump 11 are identical to each other, and the first discharge flow amount Q1 and the second discharge flow amount Q2 are the same value, it suffices to calculate either one of them.

The required flow amount Qr that is computed in step S12 and the first discharge flow amount Q1 that is calculated in step S13 are compared by the comparing unit 43 in step S14.

In step S14, when it is determined that the first discharge flow amount Q1 is equal to or higher than the required flow amount Qr, in other words, when it is possible to cover the required flow amount Qr of the working oil that is required by the automatic transmission 70 only by the first oil pump 10, the process proceeds to step S15.

In step S15, the supply state of the working oil to the automatic transmission 70 is set to the first supply state by the supply state setting unit 45. In this case, because the required flow amount Qr of the working oil that is required by the automatic transmission 70 is relatively low, it is possible to cover the required flow amount Qr only by driving the first oil pump 10.

Specifically, such a situation includes: a case in which the vehicle is in the steady travelling state at which a sudden acceleration and a sudden deceleration are not performed and in which there is almost no increase/decrease in the transmission flow amount; a case in which the leakage flow amount is relatively low because the oil temperature of the working oil is at or lower than 120° C., for example; a case in which the cooling flow amount is not required to be ensured because the oil temperature of the working oil is low to medium temperature; and so forth.

On the other hand, in step S14, when it is determined that the first discharge flow amount Q1 is lower than the required flow amount Qr, in other words, when the required flow amount Qr of the working oil that is required by the automatic transmission 70 cannot be covered only by the first oil pump 10, the process proceeds to step S16.

In step S16, the supply state of the working oil to the automatic transmission 70 is set to the second supply state by the supply state setting unit 45. In this case, because the required flow amount Qr of the working oil that is required in the automatic transmission 70 is relatively high, the required flow amount Qr is covered by driving the second oil pump 11 in addition to the first oil pump 10.

Specifically, such a situation includes: a case in which the transmission flow amount is increased at the state of travelling with acceleration/deceleration; a case in which the leakage flow amount is relatively high because the oil temperature of the working oil is exceeding 120° C., for example; a case in which the oil temperature of the working oil is high and the cooling flow amount needs to be ensured; and so forth.

In following step S17, it is determined whether or not the supply state needs to be changed, in other words, whether or not the supply state determined in steps S14 to S16 described above is the same as the supply state currently set.

Specifically, in a case in which the setting has been changed to the second supply state when the current supply state is the first supply state and in a case in which the setting has been changed to the first supply state when the current supply state is the second supply state, it is determined that the supply state needs to be changed, and the process proceeds to step S18.

On the other hand, in a case in which the supply state determined in steps S14 to S16 described above is the first supply state and the current supply state is the first supply state, and in a case in which the supply state determined in steps S14 to S16 described above is the second supply state and the current supply state is the second supply state, it is determined that the supply state need not be changed, and the process is terminated once.

In step S18, the pressure variation prediction unit 47 predicts the variation of the pressure caused in the supply passage 14, on the basis of the first discharge flow amount Q1 of the working oil discharged from the first oil pump 10 and the second discharge flow amount Q2 of the working oil discharged from the second oil pump 11 calculated by the discharge flow amount calculating unit 42, by using the map in which, for example, the pressure in the supply passage 14, the first discharge flow amount Q1, the second discharge flow amount Q2, the engine rotation speed, the temperature of the working oil before the switching valve 24 is switched, the speed or the time spent for switching the switching valve 24, and so forth are used as the parameters, and how the pressure variation caused in the supply passage 14 will be changed when these parameters are changed is predicted.

In following step S19, the switching time setting unit 48 sets the switching time for switching the position of the switching valve 24 from the first position 24a to the second position 24b or from the second position 24b to the first position 24a.

When the switching time is set by the switching time setting unit 48 in step S19, in following step S20, the position of the switching valve 24 is switched by the switching control unit 46 by spending the set switching time.

As described above, the larger the pressure variation predicted by the pressure variation prediction unit 47 is, the longer the switching time is set (for example, longer than 0.07 seconds). Therefore, in a case in which the pressure variation is predicted to become large, the switching of the position of the switching valve 24 is performed relatively slowly to avoid the sudden increase and decrease in the flow amount of the working oil flowing through the supply passage 14. Thereby, the sudden increase and decrease in the supply pressure of the working oil supplied to the automatic transmission 70 is avoided, and the pressure in the supply passage 14 is controlled at a suitable level by the pressure control valve 31. As a result, the automatic transmission 70 can be operated stably.

In addition, as described above, when the pressure variation predicted by the pressure variation prediction unit 47 is small, the switching time is set to the relatively short standard switching time of about 0.03 seconds to 0.07 seconds, for example. Therefore, in a case in which the pressure variation is predicted to be small, the switching of the position of the switching valve 24 is performed at a relatively early stage, and the flow amount of the working oil flowing through the supply passage 14 is increased and/or decreased quickly. In other words, the flow amount of the working oil flowing through the supply passage 14 quickly becomes the flow amount that is sufficient to cover the required flow amount Qr of the working oil required by the automatic transmission 70.

As described above, in a case in which the pressure variation is predicted to be small, by performing the switching of the position of the switching valve 24 at a relatively early stage, it is possible to continuously operate the automatic transmission 70 in a stable manner, and by shortening the time period during which the second oil pump 11 is wastefully driven, it is possible to improve the efficiency of the working fluid supply system 100 as a whole.

In addition, as described above, even if the supply state of the working oil to the automatic transmission 70 is switched often, by suitably setting the switching time for switching the position of the switching valve 24, the variation of the pressure of the working oil supplied to the automatic transmission 70 is suppressed, and so, it is possible to operate the automatic transmission 70 stably.

According to the above-described first embodiment, the advantages described below are afforded.

In the above-described working fluid supply system 100, the communication state achieved by the switching valve 24 is switched from the first communication state to the second communication state or from the second communication state to the first communication state via the third communication state by spending the switching time that is set in accordance with the degree of the pressure variation predicted to be caused in the supply passage 14 when the communication state achieved by the switching valve 24 is switched instantaneously.

Thus, in a case in which the pressure variation caused in the supply passage 14 is predicted to be large when the communication state achieved by the switching valve 24 is switched instantaneously, by extending the switching time, it is possible to ensure the time maintained in a state in which the second discharge passage 17 is communicated with the supply passage 14 and the second discharge passage 17 is communicated with the first drain passage 20, in other words, a state in which the working oil that has been discharged from the second oil pump 11 can flow into the passages of both of the supply passage 14 and the first drain passage 20.

Thereby, when the communication state achieved by the switching valve 24 is switched from the first communication state to the second communication state or from the second communication state to the first communication state, the sudden increase and decrease in the flow amount of the working oil supplied from the second oil pump 11 to the supply passage 14 are avoided. As a result, it is possible to suppress occurrence of the pressure variation in the supply passage 14 when the supply state of the working oil to the automatic transmission 70, to which the working oil is supplied from the first oil pump 10 and the second oil pump 11, is switched.

On the other hand, in a case in which the pressure variation caused in the supply passage 14 is predicted to be small when the communication state achieved by the switching valve 24 is switched instantaneously, by shortening the switching time, the time maintained in a state in which the working oil that has been discharged from the second oil pump 11 can flow into the passages of both of the supply passage 14 and the first drain passage 20 is shortened.

Thereby, the flow amount of the working oil flowing through the supply passage 14 is increased and/or decreased quickly and becomes the flow amount that is sufficient to cover the required flow amount Qr of the working oil required by the automatic transmission 70. Therefore, it is possible to continuously operate the automatic transmission 70 in a stable manner by shortening the switching time when the predicted pressure variation is small, and by shortening the time period during which the second oil pump 11 is wastefully driven, it is possible to improve the efficiency of the working fluid supply system 100 as a whole.

Second Embodiment

Figure 5:
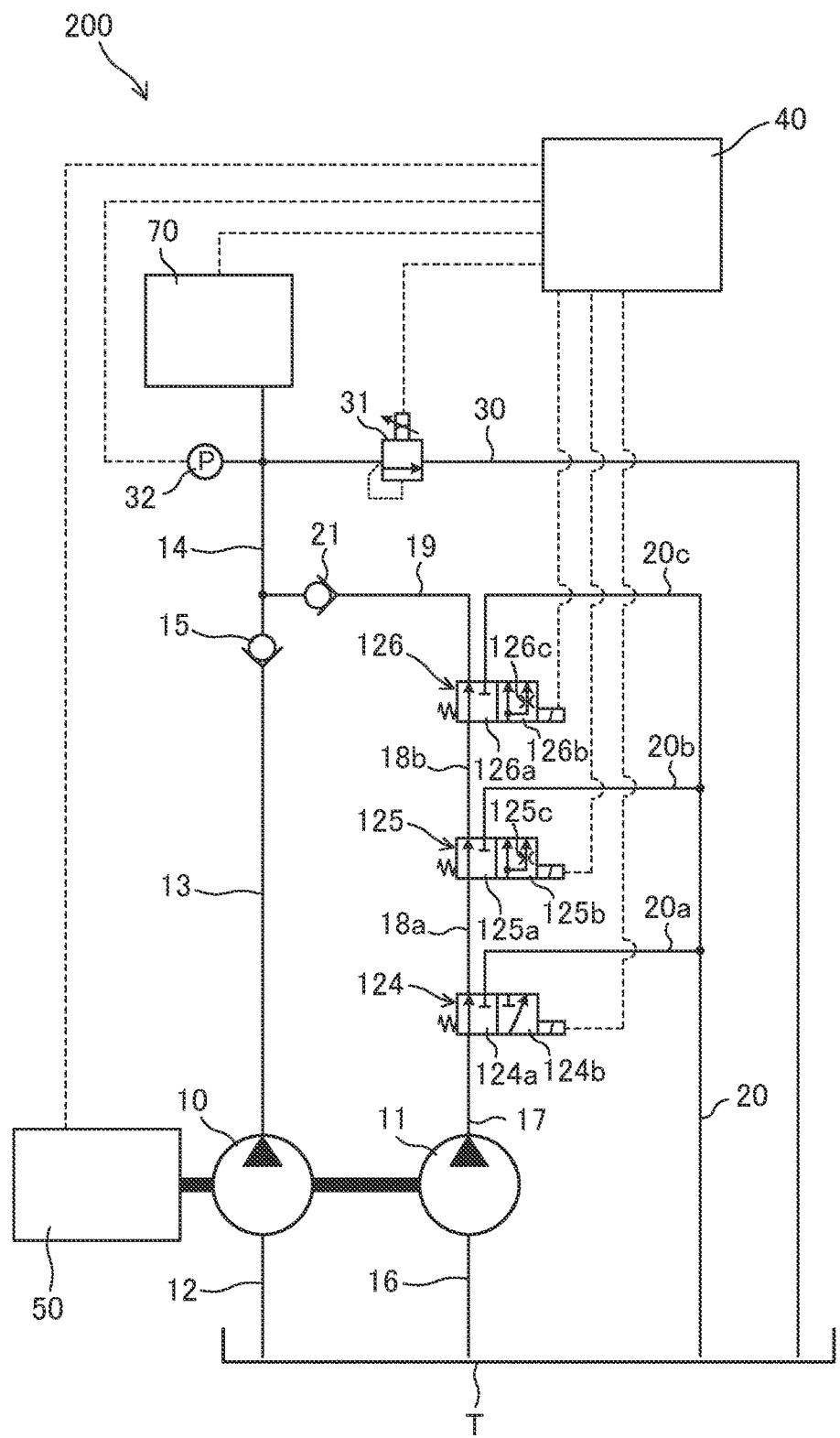
FIG. 5 is a schematic view showing the configuration of the working fluid supply system according to a second embodiment of the present invention.

Next, a working-fluid supply system 200 according to a second embodiment of the present invention will be described with reference to FIGS. 5 to 7. In the following, differences from the first embodiment will be mainly described, and components that are the same as those in the first embodiment are assigned the same reference numerals and descriptions thereof will be omitted.

Basic configurations of the working-fluid supply system 200 are the same as those of the working-fluid supply system 100 according to the first embodiment. The working fluid supply system 200 differs from the working-fluid supply system 100 in that a first switching valve 124, a second switching valve 125, and a third switching valve 126 are provided as the valve devices instead of the switching valve 24.

Because the configurations of the first oil pump 10, the second oil pump 11, and the pressure control valve 31 are the same as those in the above-described first embodiment, the description thereof will be omitted.

The first switching valve 124 that is connected to the second oil pump 11 via the second discharge passage 17 is a three-port two-position electromagnetic switching valve having a first position 124a at which the port to which the second discharge passage 17 is connected is communicated with a port to which a first connecting passage 18a is connected and a second position 124b at which the port to which the second discharge passage 17 is connected is communicated with a port to which a first drain connecting passage 20a is connected. A second end of the first connecting passage 18a, a first end of which is connected to the first switching valve 124, is connected to the second switching valve 125, and a second end of the first drain connecting passage 20a, a first end of which is connected to the first switching valve 124, is connected to the first drain passage 20.

The second switching valve 125 that is connected to the first switching valve 124 via the first connecting passage 18a is the three-port two-position electromagnetic switching valve having a first position 125a at which a port to which the first connecting passage 18a is connected is communicated with a port to which a second connecting passage 18b is connected and a second position 125b at which a port to which the first connecting passage 18a is connected is communicated with a port to which the second connecting passage 18b is connected and a port to which the first connecting passage 18a is connected is communicated via a restrictor 125c with a port to which a second drain connecting passage 20b is connected. A second end of the second connecting passage 18b, a first end of which is connected to the second switching valve 125, is connected to the third switching valve 126, and a second end of the second drain connecting passage 20b, a first end of which is connected to the second switching valve 125, is connected to the first drain passage 20.

The third switching valve 126 that is connected to the second switching valve 125 via the second connecting passage 18b is the three-port two-position electromagnetic switching valve having a first position 126a at which a port to which the second connecting passage 18b is connected is communicated with a port to which the connecting passage 19 is connected and a second position 126b at which a port to which the second connecting passage 18b is connected is communicated with a port to which the connecting passage 19 is connected and a port to which the second connecting passage 18b is connected is communicated via a restrictor 126c with a port to which a third drain connecting passage 20c is connected. A second end of the third drain connecting passage 20c, a first end of which is connected to the third switching valve 126, is connected to the first drain passage 20.

Although the positions of these switching valves 124, 125, and 126 are controlled by the controller 40, in order to enable the supply of the working oil from the second oil pump 11 even when the switching valves 124, 125, and 126 are failed, they are biased so as to be respectively set at the first positions 124a, 125a, and 126a when electric current is not supplied. In this embodiment, the first drain passage 20 that is connected to the respective switching valves 124, 125, and 126 via the drain connecting passages 20a, 20b, and 20c corresponds to the another passage different from the supply passage 14.

Next, with reference to FIG. 6, how the respective sizes of the cross-sectional areas of the first communicating passage and the second communicating passage are changed in accordance with the position of each of the switching valves 124, 125, and 126 will be described in a case in which, in the switching valves 124, 125, and 126, the passage through which the second discharge passage 17 and the connecting passage 19 are communicated is set as the first communicating passage and the passage through which the second discharge passage 17 and the first drain passage 20 are communicated is set as the second communicating passage. FIG. 6 is a diagram schematically showing how the respective sizes of the cross-sectional areas of the first communicating passage and the second communicating passage are changed in accordance with the position of each of the switching valves 124, 125, and 126.

Figure 6:
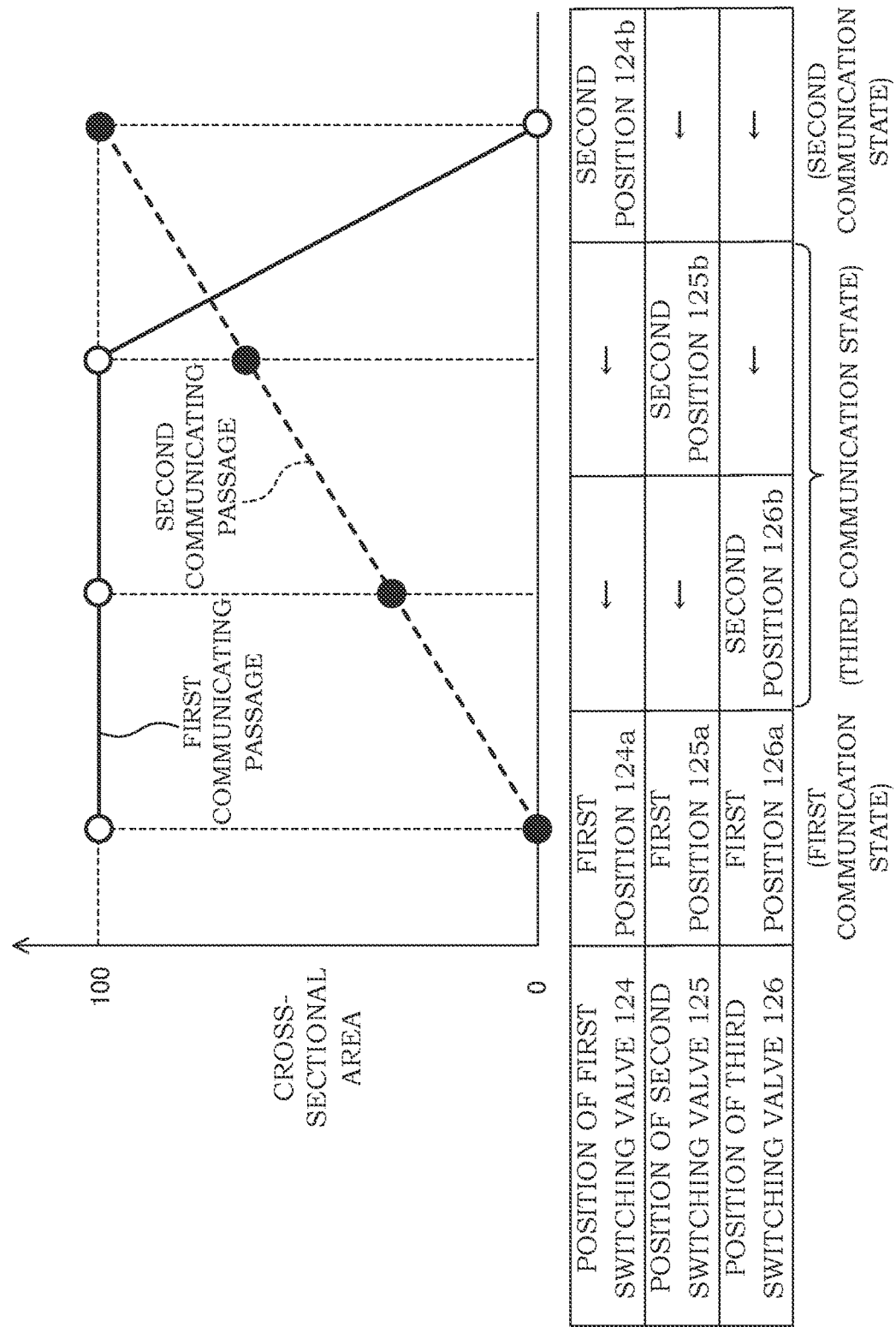
FIG. 6 is a diagram for explaining the communication state of the switching valve of the working fluid supply system according to the second embodiment of the present invention.

As shown in FIG. 6, the cross-sectional area of the first communicating passage is set so as to be the largest when the position of the first switching valve 124 is set at the first position 124a and so as to be zero when the position of the first switching valve 124 is set at the second position 124b, in other words, the cross-sectional area is set such that the first communicating passage is closed when the position of the first switching valve 124 is set at the second position 124b.

On the other hand, the cross-sectional area of the second communicating passage is set so as to be the largest when the position of the first switching valve 124 is set at the second position 124b. The cross-sectional area is set so as to be gradually reduced when the position of the first switching valve 124 is set at the first position 124a and the positions of the second switching valve 125 and the third switching valve 126 are set at the second positions 125b and 126b and when the positions of the first switching valve 124 and the second switching valve 125 are set at the first positions 124a and 125a and the position of the third switching valve 126 is set at the second position 126b. The cross-sectional area is set so as to be zero when the positions of all of the switching valves 124, 125, and 126 are set at the first positions 124a, 125a, and 126a, in other words, the second communicating passage is closed when the positions of all of the switching valves 124, 125, and 126 are set at the first positions 124a, 125a, and 126a.

As the cross-sectional area of the first communicating passage and the cross-sectional area of the second communicating passage are set as described above, when the position of the first switching valve 124 is set at the first position 124*a* and the positions of the second switching valve 125 and the third switching valve 126 are set at the second positions 125*b* and 126*b*, and when the positions of the first switching valve 124 and the second switching valve 125 are set at the first positions 124*a* and 125*a* and the position of the third switching valve 126 is set at the second position 126*b*, the second discharge passage 17 is communicated with the connecting passage 19 through the first communicating passage having a relatively large cross-sectional area, and the second discharge passage 17 is communicated with the first drain passage 20 through the second communicating passage having a cross-sectional area that is smaller relative to that of the first communicating passage.

Thus, when the position of the first switching valve 124 is set at the first position 124*a* and the positions of the second switching valve 125 and the third switching valve 126 are set at the second positions 125*b* and 126*b*, and when the positions of the first switching valve 124 and the second switching valve 125 are set at the first positions 124*a* and 125*a* and the position of the third switching valve 126 is set at the second position 126*b*, the flow amount of the working oil flowing into the first drain passage 20 is prevented from becoming larger than the flow amount of the working oil flowing into the supply passage 14.

In a case in which the first drain passage 20 in communication with the second discharge passage 17 is not the passage that returns the working oil to the tank T, but is the passage through which the working oil to be supplied to any of the fluid apparatuses flows, and in a case in which the pressure in the passage is substantially the same as the pressure in the supply passage 14, it is preferable that the restrictors be respectively provided at a portion through which the first connecting passage 18*a* is communicated with the second connecting passage 18*b* at the second position 125*b* of the second switching valve 125 and at a portion through which the second connecting passage 18*b* is communicated with the connecting passage 19 at the second position 126*b* of the third switching valve 126, such that the flow amount of the working oil flowing into the supply passage 14 and the flow amount of the working oil flowing into the another passage different from the supply passage 14 become the same by symmetrically increasing or decreasing the cross-sectional area of the first communicating passage and the cross-sectional area of the second communicating passage.

When the position of the first switching valve 124 having the above-described configuration is switched to the first position 124*a*, the position of the second switching valve 125 is switched to the first position 125*a*, and the position of the third switching valve 126 is switched to the first position 126*a*, the first communication state in which the second discharge passage 17 is communicated with the connecting passage 19, and the communication between the second discharge passage 17 and the first drain passage 20 is shut off is established. In the first communication state, the working oil that has been discharged from the second oil pump 11 is supplied to the automatic transmission 70 through the connecting passage 19 and the supply passage 14.

On the other hand, when the position of the first switching valve 124 is switched to the second position 124*b*, the second communication state in which the second discharge passage 17 is communicated with the first drain passage 20 and the communication between the second discharge passage 17 and the connecting passage 19 is shut off is established. In the second communication state, the working oil that has been discharged from the second oil pump 11 is discharged to the tank T through the first drain passage 20.

When the position of the switching valve 124 is set at the second position 124*b*, a state in which both of the suction side and the discharge side of the second oil pump 11 are communicated with the tank T is established, and the pressure difference between the suction side and the discharge side of the second oil pump 11 becomes substantially zero. Therefore, the second oil pump 11 is shifted to the no-load operation state, in other words, the second oil pump 11 is shifted to the state in which the load for driving the second oil pump 11 is scarcely applied to the engine 50. Thus, in order to improve the efficiency of the working fluid supply system 200, it is preferred that the second oil pump 11 be set to the no-load operation state when the discharge of the working oil from the second oil pump 11 is not required.

In addition, when the position of the first switching valve 124 is switched to the first position 124*a* and when at least one of the positions of the second switching valve 125 and the third switching valve 126 is switched to the second positions 125*b* and 126*b*, the third communication state in which the second discharge passage 17 is communicated with the connecting passage 19 and the second discharge passage 17 is communicated with the first drain passage 20 is established. In the third communication state, the working oil that has been discharged from the second oil pump 11 is supplied to the automatic transmission 70 through the connecting passage 19 and the supply passage 14 and is discharged to the tank T through the first drain passage 20.

At this time, the ratio between the flow amount of the working oil flowing into the supply passage 14 and the flow amount of the working oil flowing into the first drain passage 20 is changed in accordance with the ratio between the cross-sectional area of the first communicating passage and the cross-sectional area of the second communicating passage, the pressure in the supply passage 14, or the pressure in the first drain passage 20. Because the check valve 21 is provided between the connecting passage 19 and the supply passage 14 as described above, the flow out of the working oil in the supply passage 14 to the first drain passage 20 through the second switching valve 125 and the third switching valve 126 is avoided.

As described above, also in the working fluid supply system 200, similarly to the above-described first embodiment, it is possible to supply the working oil to the automatic transmission 70 also from the second oil pump 11 in addition to the first oil pump 10 if required.

The position of each of the switching valves 124, 125, and 126 may be switched as a valve body (not shown) is directly driven by the solenoid (not shown) or may be switched by the presence/absence or the level of the pilot pressure acting on the valve body, and as a driving system of each of the switching valves 124, 125, and 126, any system may be employed as long as the positions are switched in accordance with instructions from the controller 40.

The controller 40 has the configuration that is similar to that in the above-described first embodiment, and in the supply state setting unit 45, sets the supply state for supplying the working oil to the automatic transmission 70 from two states: the first supply state in which the position of the first switching valve 124 is switched to the second position 124*b* by the switching control unit 46, the working oil is not supplied to the automatic transmission 70 from the second oil pump 11, and the working oil is supplied to the automatic transmission 70 only from the first oil pump 10; and the second supply state in which the positions of all of the switching valves 124, 125, and 126 are switched to the first positions 124a, 125a, and 126a by the switching control unit 46, and the working oil is supplied to the automatic transmission 70 from two pumps: the first oil pump 10 and the second oil pump 11.

In the above, when the supply state of the working oil to the automatic transmission 70 is switched from the first supply state to the second supply state, if the respective switching valves 124, 125, and 126 are operated and the state is switched instantaneously from the second communication state to the first communication state, the flow amount of the working oil flowing into the supply passage 14 is suddenly increased to suddenly increase the pressure in the supply passage 14, and the control of the pressure performed by the pressure control valve 31 cannot follow the increase. Then, the pressure of the working oil to be supplied to the automatic transmission 70 is increased so as to become higher than the pressure set in advance, as a result, there is a risk in that the automatic transmission 70 cannot be operated stably.

Similarly, when the supply state of the working oil to the automatic transmission 70 is switched from the second supply state to the first supply state, if the respective switching valves 124, 125, and 126 are operated and the state is switched instantaneously from the first communication state to the second communication state, the flow amount of the working oil flowing into the supply passage 14 is suddenly decreased to suddenly decrease the pressure in the supply passage 14, and the pressure of the working oil to be supplied to the automatic transmission 70 becomes lower than the pressure set in advance. As a result, there is a risk in that the automatic transmission 70 cannot be operated stably.

In order to avoid the variation of the pressure in the supply passage 14 as described above, similarly to the above-described first embodiment, the controller 40 further has: the pressure variation prediction unit 47 that predicts the variation of the pressure that will be caused in the supply passage 14 in a case in which the first communication state is switched instantaneously to the second communication state or in a case in which the second communication state is switched instantaneously to the first communication state; and the switching time setting unit 48 that sets the switching time to be spent for switching the first communication state to the second communication state or the second communication state to the first communication state in accordance with the variation of pressure predicted by the pressure variation prediction unit 47.

Because the pressure variation prediction unit 47 is a part that has the similar functions with those of the pressure variation prediction unit 47 in the above-described first embodiment, the description thereof will be omitted.

In this embodiment, in order to switch the first communication state to the second communication state or the second communication state to the first communication state via the third communication state, the positions of the three switching valves 124, 125, and 126 need to be switched as described above. In other words, the time spent until the switching of the three switching valves 124, 125, and 126 is completed corresponds to the switching time that is spent for the switching of the first communication state to the second communication state or the second communication state to the first communication state via the third communication state. Thus, the switching time setting unit 48 sets time intervals for switching the respective switching valves 124, 125, and 126 as the switching time.

Specifically, when the first communication state is switched to the second communication state, the switching time interval between the switching of the position of the third switching valve 126 from the first position 126a to the second position 126b and the switching of the position of the second switching valve 125 from the first position 125a to the second position 125b and the switching time interval between the switching of the position of the second switching valve 125 from the first position 125a to the second position 125b and the switching of the position of the first switching valve 124 from the first position 124a to the second position 124b are set as the switching time to be spent for switching from the first communication state to the second communication state via the third communication state.

In addition, when the second communication state is switched to the first communication state, the switching time interval between the switching of the position of the first switching valve 124 from the second position 124b to the first position 124a and the switching of the position of the second switching valve 125 from the second position 125b to the first position 125a and the switching time interval between the switching of the position of the second switching valve 125 from the second position 125b to the first position 125a and the switching of the position of the third switching valve 126 from the second position 126b to the first position 126a are set as the switching time to be spent for switching the second communication state to the first communication state via the third communication state.

Each of the switching time intervals is set to the standard time interval in a case in which the pressure variation predicted by the pressure variation prediction unit 47 is so small that the operation of the automatic transmission 70 is not affected, and each of the switching time intervals is set to the switching time interval obtained by adding the predetermined additional time interval to the standard time interval, in other words, the switching time interval that is longer than the standard time interval in a case in which the pressure variation predicted by the pressure variation prediction unit 47 is so large that the operation of the automatic transmission is affected. The duration of the standard time interval is, for example, from 0.03 seconds to seconds, and preferably about 0.05 seconds.

How long the predetermined additional time interval should be in relation to the pressure variation is determined in advance by experiments, etc. and the obtained results are mapped, and they are stored in the ROM of the controller 40 together with the standard time interval. For the setting of the predetermined additional time interval, in addition to the predicted pressure variation, the pressure of the working oil acting on the valve body of each of the switching valves 124, 125, and 126, etc. may be taken into consideration, and arithmetic expressions for computing the predetermined additional time interval by using these as the parameters may be stored in the ROM of the controller 40.

The switching control unit 46 then controls the switching of the respective switching valves 124, 125, and 126 such that, for example, the switching time interval, which is obtained by adding the switching time interval between the switching of the position of the first switching valve 124 and the switching of the position of the second switching valve 125, to the switching time interval between the switching of the position of the second switching valve 125 and the switching of the position of the third switching valve 126, becomes the switching time interval that is set by the switching time setting unit 48.

The switching time setting unit 48 may, for example, set the switching time interval between the switching of the position of the first switching valve 124 and the switching of the position of the second switching valve 125 separately from the switching time interval between the switching of the position of the second switching valve 125 and the switching of the position of the third switching valve 126, and in this case, the switching control unit 46 controls the switching of the respective switching valves 124, 125, and 126 such that the respective switching time intervals becomes the switching time interval that is set by the switching time setting unit 48.

As described above, the larger the variation of pressure predicted by the pressure variation prediction unit 47 is, the longer the switching time interval is set. In turn, the longer the switching time interval is set, the longer the time maintained in the state in which the position of the first switching valve 124 is set at the first position 24a, and at least one of the positions of the second switching valve 125 and the third switching valve 126 is set at the second positions 125b and 126b becomes, in other words, the longer the time maintained in the third communication state becomes.

Therefore, in the course of the switching of the first communication state to the second communication state via the third communication state, the flow amount of the working oil supplied from the second oil pump 11 to the supply passage 14 is gradually reduced while the amount of the working oil discharged to the tank T through the first drain passage 20 is gradually increased. Thus, the sudden decrease in the flow amount of the working oil flowing through the supply passage 14 is avoided. Thereby, the sudden decrease in the supply pressure of the working oil supplied to the automatic transmission 70 is also avoided, and as a result, it becomes possible to operate the automatic transmission 70 stably.

Similarly, in the course of the switching of the second communication state to the first communication state via the third communication state, the flow amount of the working oil discharged to the tank T through the first drain passage 20 is gradually reduced while the flow amount of the working oil supplied from the second oil pump 11 to the supply passage 14 is gradually increased. Thus, the sudden increase in the flow amount of the working oil flowing through the supply passage 14 is avoided. Thereby, the sudden increase in the supply pressure of the working oil supplied to the automatic transmission 70 is also avoided, and as a result, it becomes possible to operate the automatic transmission 70 stably.

Next, the control performed by the controller 40, which has the above-described functions, at the time when the working oil is supplied to the automatic transmission 70 will be described with reference to the flow chart shown in FIG. 7. The control shown in FIG. 7 is executed repeatedly by the controller 40 at every predetermined time periods.

Figure 7:
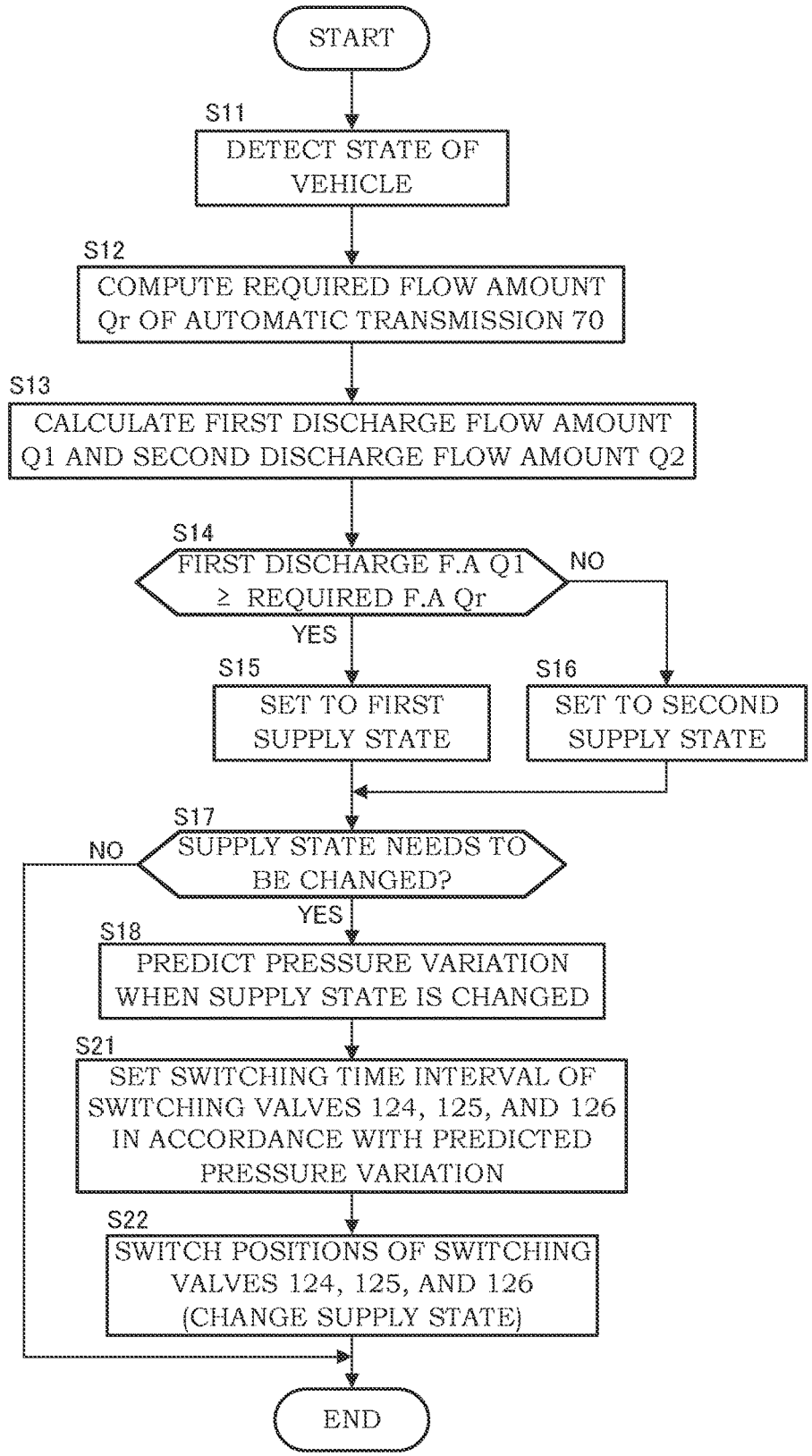
FIG. 7 is a flow chart showing a procedure of the control executed by the controller of the working fluid supply system according to the second embodiment of the present invention.

Because the contents of the control from step S11 to step S18 in FIG. 7 are the same as the control in the above-described first embodiment shown in FIG. 4, the description thereof will be omitted.

In step S21 following step S18, the switching time setting unit 48 sets the switching time interval for switching the first communication state to the second communication state or for switching the second communication state to the first communication state.

In step S21, when the switching time interval is set by the switching time setting unit 48, in subsequent step S22, the switching of the respective switching valves 124, 125, and 126 are controlled by the switching control unit 46.

In a case in which the first communication state is switched to the second communication state, the switching of the respective switching valves 124, 125, and 126 is controlled such that the switching time interval, which is obtained by adding the switching time interval between the switching of the position of the third switching valve 126 and the switching of the position of the second switching valve 125 to the switching time interval between the switching of the position of the second switching valve 125 and the switching of the position of the first switching valve 124, becomes the switching time interval that is set by the switching time setting unit 48.

The switching from the first communication state to the second communication state is performed by following procedures.

In the state in which the position of the first switching valve 124 is set at the first position 124a, the position of the second switching valve 125 is set at the first position 125a, and the position of the third switching valve 126 is set at the first position 126a, in other words, the state in which all of the working oil that has been discharged from the second oil pump 11 is supplied to the supply passage 14, the position of the third switching valve 126 is first switched to the second position 126b. In this state, a part of the working oil that has been discharged from the second oil pump 11 is returned to the tank T through the restrictor 126c, and so, the flow amount of the working oil supplied from the second oil pump 11 to the supply passage 14 is reduced.

From this state, the position of the second switching valve 125 is switched to the second position 125b, and thereby, the working oil that has been discharged from the second oil pump 11 is returned to the tank T through the restrictor 125c in addition to the restrictor 126c. Thus, the flow amount of the working oil supplied from the second oil pump 11 to the supply passage 14 is reduced further.

Furthermore, from this state, by switching the position of the first switching valve 124 to the second position 124b, the communication between the second discharge passage 17 and the supply passage 14 is shut off, and so, all of the working oil that has discharged from the oil pump 11 is returned to the tank T through the first drain connecting passage 20a. As described above, by sequentially switching the positions of the switching valves 124, 125, and 126 to the second position 124b, 125b, 126b, respectively, the cross-sectional area of the second communicating passage through which the second discharge passage 17 is communicated with the first drain passage 20 is increased in a stepwise manner, and thus, the communication state is switched from the first communication state to the second communication state. The switching of the position of the second switching valve 125 and the switching of the position of the third switching valve 126 may be performed in any order.

On the other hand, in a case in which the second communication state is switched to the first communication state, the switching of the respective switching valves 124, 125, and 126 are controlled such that the switching time interval obtained by adding the switching time interval between the switching of the position of the first switching valve 124 and the switching of the position of the second switching valve 125 to the switching time interval between the switching of the position of the second switching valve 125 and the switching of the position of the third switching valve 126 becomes the switching time interval that is set by the switching time setting unit 48.

The switching from the second communication state to the first communication state is performed by following procedures.

In a case in which the second communication state is switched to the first communication state, from the state in which the position of the first switching valve 124 is set at the second position 124b, the position of the second switching valve 125 is set at the second position 125b, and the position of the third switching valve 126 is set at the second position 126b, in other words, from the state in which all of the working oil that has been discharged from the second oil pump 11 is returned to the tank T, the position of the first switching valve 124 is switched to the first position 124a. In this state, the second discharge passage 17 is communicated with the supply passage 14 while the second discharge passage 17 is communicated with the tank T through the restrictor 125c and the restrictor 126c. Thus, a part of the working oil that has been discharged from the second oil pump 11 is supplied to the supply passage 14, and the remaining of the working oil that has discharged from the second oil pump 11 is returned to the tank T.

By switching the position of the second switching valve 125 to the first position 125a from this state, the communication between the first connecting passage 18a and the second drain connecting passage 20b is shut off, and the second discharge passage 17 is communicated with the tank T only through the restrictor 126c. Thus, while the flow amount of the working oil returning to the tank T is reduced, the flow amount of the working oil supplied from the second oil pump 11 to the supply passage 14 is increased.

Furthermore, by switching the position of the third switching valve 126 to the first position 126a from this state, the communication between the second discharge passage 17 and the tank T is shut off, and all of the working oil that has been discharged from the oil pump 11 is supplied to the supply passage 14. As described above, by reducing the cross-sectional area of the second communicating passage through which the second discharge passage 17 is communicated with the first drain passage 20 in a stepwise manner by sequentially switching the positions of the respective switching valves 124, 125, and 126 to the first positions 124a, 125a, and 126a, the communication state is switched from the second communication state to the first communication state. The switching of the position of the second switching valve 125 and the switching of the position of the third switching valve 126 may be performed in any order.

As described above, the larger the pressure variation predicted by the pressure variation prediction unit 47 is, the longer the switching time interval is set (for example, longer than 0.07 seconds). Therefore, in a case in which the pressure variation is predicted to become large, because the time elapsed from the switching of the position of the first switching valve 124 until the switching of the position of the third switching valve 126 is completed, or the time elapsed from the switching of the position of the third switching valve 126 until the switching of the position of the first switching valve 124 is completed becomes relatively long, the time maintained in the third communication state is ensured, and so, the sudden increase and decrease in the flow amount of the working oil flowing through the supply passage 14 is avoided. Thereby, the sudden increase and decrease in the supply pressure of the working oil supplied to the automatic transmission 70 is avoided, and the pressure in the supply passage 14 is controlled at a suitable level by the pressure control valve 31. As a result, the automatic transmission 70 can be operated stably.

In addition, as described above, when the pressure variation predicted by the pressure variation prediction unit 47 is small, the switching time interval is set to the relatively short standard time interval of about 0.03 seconds to 0.07 seconds, for example. Therefore, in a case in which the pressure variation is predicted to be small, the time elapsed from the switching of the position of the first switching valve 124 until the switching of the position of the third switching valve 126 is completed or the time elapsed from the switching of the position of the third switching valve 126 until the switching of the position of the first switching valve 124 is completed become relatively short, and the flow amount of the working oil flowing through the supply passage 14 is increased and/or decreased quickly. In other words, the flow amount of the working oil flowing through the supply passage 14 quickly becomes the flow amount that is sufficient to cover the required flow amount Qr of the working oil required by the automatic transmission 70.

As described above, in a case in which the pressure variation is predicted to be small, by performing the position of each of the switching valves 124, 125, and 126 at a relatively early stage, it is possible to continuously operate the automatic transmission 70 in a stable manner, and by shortening the time period during which the second oil pump 11 is wastefully driven, it is possible to improve the efficiency of the working fluid supply system 200 as a whole.

In addition, as described above, even if the supply state of the working oil to the automatic transmission 70 is switched often, by suitably setting the switching time interval for switching the position of each of the switching valves 124, 125, and 126, the variation of the pressure of the working oil supplied to the automatic transmission 70 is suppressed, and so, it is possible to operate the automatic transmission 70 stably.

According to the above-described second embodiment, the advantages described below are afforded.

In the above-described working fluid supply system 200, the communication state achieved by the switching valves 124, 125, and 126 is switched from the first communication state to the second communication state or from the second communication state to the first communication state via the third communication state by spending the switching time that is set in accordance with the degree of the pressure variation predicted to be caused in the supply passage 14 when the communication state achieved by the switching valves 124, 125, and 126 is switched instantaneously.

Thus, in a case in which the pressure variation caused in the supply passage 14 is predicted to be large when the communication state achieved by the switching valves 124, 125, and 126 is switched instantaneously, by extending the switching time, it is possible to ensure the time maintained in a state in which the second discharge passage 17 is communicated with the supply passage 14 and the second discharge passage 17 is communicated with the first drain passage 20, in other words, a state in which the working oil that has been discharged from the second oil pump 11 can flow into the passages of both of the supply passage 14 and the first drain passage 20.

Thereby, when the communication state achieved by the switching valves 124, 125, and 126 is switched from the first communication state to the second communication state or from the second communication state to the first communication state, the sudden increase and decrease in the flow amount of the working oil supplied from the second oil pump 11 to the supply passage 14 are avoided. As a result, it is possible to suppress occurrence of the pressure variation in the supply passage 14 when the supply state of the working oil to the automatic transmission 70 in which the working oil is supplied from the first oil pump 10 and the second oil pump 11.

On the other hand, in a case in which the pressure variation caused in the supply passage 14 is predicted to be small when the communication state achieved by the switching valves 124, 125, and 126 is switched instantaneously, by shortening the switching time, the time maintained in a state in which the working oil that has been discharged from the second oil pump 11 can flow into the passages of both of the supply passage 14 and the first drain passage 20 is shortened.

Thereby, the flow amount of the working oil flowing through the supply passage 14 is increased and/or decreased quickly and becomes the flow amount that is sufficient to cover the required flow amount Qr of the working oil required by the automatic transmission 70. Therefore, it is possible to continuously operate the automatic transmission 70 in a stable manner by shortening the switching time when the predicted pressure variation is small, and by shortening the time period during which the second oil pump 11 is wastefully driven, it is possible to improve the efficiency of the working fluid supply system 200 as a whole.

In the above-described second embodiment, although two switching valves 125 and 126 are provided on the downstream side of the first switching valve 124, the number of the switching valves to be provided on the downstream side of the first switching valve 124 is not limited thereto, and it suffices that at least one switching valve having the position that achieves the third communication state is provided on the downstream side of the first switching valve 124. The number of such a switching valve may be, for example, only one, or may be three or more. Also in this case, by ensuring the time maintained in the state in which the working oil that has been discharged from the second oil pump 11 can flow into the passages of both of the supply passage 14 and the first drain passage 20, it is possible to suppress the occurrence of the pressure variation in the supply passage 14 when the supply state of the working oil to the automatic transmission 70 is switched.

Next, modifications of the respective embodiments described above will be described. The modifications described below also fall within the scope of the present invention, and it is also possible to combine the configurations shown in the modifications with the configurations described in the above respective embodiments, or to combine the configurations described in the following different modifications.

In each of the above-described embodiments, the first oil pump 10 and the second oil pump 11 are each a vane pump of a fixed displacement type. Instead of this configuration, the first oil pump 10 and the second oil pump 11 may be each a variable displacement vane pump, a piston pump, an internal gear pump, and an external gear pump.

In addition, in each of the above-described embodiments, the pump that supplies the working oil to the automatic transmission 70 is configured of two pumps, i.e., the first oil pump 10 and the second oil pump 11. The pump that supplies the working oil to the automatic transmission 70 is not limited thereto, and a plurality of oil pumps driven by the output from the engine 50 may be provided in addition to the valve devices, and oil pumps driven by the output from the electric motor may also be provided.

In addition, in the respective embodiments described above, although the working oil is used as the working fluid, a non-compressive fluid such as water, aqueous solution, and so forth may also be used instead of the working oil.

In addition, although a case in which the automatic transmission 70 is a transmission provided with the belt type continuously variable transmission (the CVT) has been described in the respective embodiments described above, the automatic transmission 70 may be of any type as long as it is operated by utilizing the pressure of the working oil, and the automatic transmission 70 may be provided with the toroidal continuously variable transmission or the planetary gear mechanism.

In addition, although the working-fluid supply systems 100 and 200 have been described as those for supplying the working fluid to the motive force transmitting device of the vehicle in the respective embodiments described above, the applications of the working-fluid supply systems 100 and 200 of the present invention are not limited to the vehicles, and the working-fluid supply systems 100 and 200 may also be applied to, for example, construction work equipment, ships, aircraft, and stationary equipment as long as they are provided with a fluid apparatus operated by the working fluid supplied by a pump.

In addition, in each of the above-described embodiments, the first oil pump 10 and the second oil pump 11 are driven by the output from the engine 50. The driving source driving the first oil pump 10 and the second oil pump 11 is not limited to the engine 50, and for example, the driving source may be an electric motor driving the driving wheel of the vehicle.

In addition, in the respective embodiments described above, although the various signals are listed as the signals indicating the state of the vehicle to be input to the controller 40, in a case in which the torque converter is provided in the automatic transmission 70, for example, the signals indicating the operated state and the engaged state of the torque converter may be input to the controller 40 additionally. In this case, the required flow amount Qr of the automatic transmission 70 may be computed or the switching of the supply state of the working oil to the automatic transmission 70 may be limited by taking the state of the torque converter into consideration. For example, when it is detected that the torque converter is in a semi-engaged state (a slip lock up state), the shifting of the working oil the supply state to other supply state may be prohibited. By doing so, it is possible to maintain the torque converter in a stable operated state. In addition, the signals indicating the operated amount and the operated speed of the brake may be input to the controller 40 as the signals indicating the deceleration state of the vehicle.

In addition, in each of the above-described embodiments, in the discharge flow amount calculating unit 42 of the controller 40, the first discharge flow amount Q1 of the working oil discharged from the first oil pump 10 and the second discharge flow amount Q2 of the working oil discharged from the second oil pump 11 are calculated. Instead of this configuration, the actual discharge flow amount of the working oil discharged from the first oil pump 10 and the second oil pump 11 may be measured by a flow amount sensor, etc. directly.

The configurations, operations, and effects of the embodiments of the present invention will be collectively described below.

The working fluid supply system 100, 200 is provided with: the first oil pump 10 and the second oil pump 11 driven by the output from the engine 50, the first oil pump 10 and the second oil pump 11 being capable of supplying the working oil to the automatic transmission 70 through the supply passage 14; the valve device 24, 124, 125, 126 configured to cause the second discharge passage 17 that is the discharge passage of the second oil pump 11 to communicate with at least one of the supply passage 14 and the first drain passage 20 that is the another passage different from the supply passage 14; and the controller 40 configured to change the communication state of the valve device in accordance with the required flow amount of the working oil required by the automatic transmission 70, wherein the valve device has: the first communication state at which the second discharge passage 17 is communicated only with the supply passage 14; the second communication state at which the second discharge passage 17 is communicated only with the first drain passage 20; and the third communication state at which the second discharge passage 17 is communicated with the supply passage 14 and the first drain passage 20 while the first communication state is shifted to the second communication state or while the second communication state is shifted to the first communication state, and the controller 40 is: configured to set the switching time for switching the communication state of the valve device in accordance with the degree of the pressure variation predicted to be caused in the supply passage 14 when the communication state of the valve device is switched instantaneously from the first communication state to the second communication state or from the second communication state to the first communication state; and configured to switch the communication state of the valve device from the first communication state to the second communication state or from the second communication state to the first communication state via the third communication state by spending the set switching time.

With this configuration, the communication state achieved by the switching valve 24, 124, 125, 126 is switched from the first communication state to the second communication state or from the second communication state to the first communication state via the third communication state by spending the switching time that is set in accordance with the degree of the predicted pressure variation. Thus, in a case in which the pressure variation caused in the supply passage 14 is predicted to be large when the communication state achieved by the switching valves 124, 125, and 126 is switched instantaneously, by extending the switching time, it is possible to ensure the time maintained in the state in which the second discharge passage 17 is communicated with the supply passage 14 and the second discharge passage 17 is communicated with the first drain passage 20, in other words, the state in which the working oil that has been discharged from the second oil pump 11 can flow into the passages of both of the supply passage 14 and the first drain passage 20.

By doing so, when the communication state achieved by the switching valve 24, 124, 125, 126 is switched from the first communication state to the second communication state or from the second communication state to the first communication state, the sudden increase and decrease in the flow amount of the working oil supplied from the second oil pump 11 to the supply passage 14 is avoided. As a result, when the supply state of the working oil to the automatic transmission 70 in which the working oil is supplied from the first oil pump 10 and the second oil pump 11 is switched, it is possible to suppress the occurrence of the pressure variation in the supply passage 14.

On the other hand, in a case in which the pressure variation caused in the supply passage 14 is predicted to be small when the communication state achieved by the switching valves 124, 125, and 126 is switched instantaneously, by shortening the switching time, it is possible to shorten the time maintained in a state in which the working oil that has been discharged from the second oil pump 11 can flow into the passages of both of the supply passage 14 and the first drain passage 20.

By doing so, the flow amount of the working oil flowing through the supply passage 14 is increased and/or decreased quickly, and the flow amount that is sufficient to cover the required flow amount Qr of the working oil required by the automatic transmission 70 is obtained. Therefore, by shortening the switching time when the predicted pressure variation is small, it is possible to continuously operate the automatic transmission 70 in a stable manner, and at the same time, by shortening the time period during which the second oil pump 11 is wastefully driven, it is possible to improve the efficiency of the working fluid supply system 100, 200 as a whole.

In addition, the controller 40 has: the discharge flow amount calculating unit 42 configured to calculate the first discharge flow amount Q1 of the working oil discharged from the first oil pump 10 and the second discharge flow amount Q2 of the working oil discharged from the second oil pump 11; the pressure variation prediction unit 47 configured to predict the variation of the pressure caused in the supply passage 14 on the basis of the first discharge flow amount Q1 and the second discharge flow amount Q2; and the switching time setting unit 48 configured to set the switching time in accordance with the variation of pressure predicted by the pressure variation prediction unit 47, wherein as the discharged amount of the second oil pump 11 is increased, the pressure variation is predicted to be increased, and the switching time is set so as to be longer.

With this configuration, the larger the discharge amount of the second oil pump 11 is, the longer the switching time is set. In a case in which the communication state achieved by the switching valve 24, 124, 125, 126 is switched instantaneously, as the discharged amount of the second oil pump 11 is increased, the increase and/or the decrease in the flow amount of the working oil flowing through the supply passage 14 is increased, and therefore, a relatively large pressure variation tends to be caused in the supply passage 14. Thus, by setting the switching time so as to be longer as the discharged amount of the second oil pump 11 is increased, it is possible to avoid the sudden increase and decrease in the flow amount of the working oil supplied from the second oil pump 11 to the supply passage 14 by extending the time maintained in a state in which the working oil that has been discharged from the second oil pump 11 can flow into the passages of both of the supply passage 14 and the first drain passage 20.

In addition, the valve device is the switching valve 24 having: the first position 24a at which the first communication state is achieved; the second position 24b at which the second communication state is achieved; and the third position 24c at which the third communication state is achieved between the first position 24a and the second position 24b, and the controller 40 is configured to switch the position of the switching valve 24 by spending the switching time such that the first communication state is switched to the second communication state or the second communication state is switched to the first communication state via the third communication state.

With this configuration, the valve device is the switching valve 24 having: the first position 24a at which the first communication state is achieved; the second position 24b at which the second communication state is achieved; the third position 24c at which the third communication state is achieved between the first position 24a and the second position 24b. By switching the position of the switching valve 24 having such a simple configuration by spending the switching time, it is possible to ensure the time maintained in the state at which the position is switched to the third position 24c, in other words, a state in which the working oil that has been discharged from the second oil pump 11 can flow into the passages of both of the supply passage 14 and the first drain passage 20. Thereby, it is possible to avoid the sudden increase and decrease in the flow amount of the working oil supplied from the second oil pump 11 to the supply passage 14 when the first communication state is switched to the second communication state or when the second communication state is switched to the first communication state.

In addition, the another passage is the first drain passage 20 configured to return the working oil to the tank T, the working oil being discharged from the second oil pump 11, at the third position 24c, the cross-sectional area of the second communicating passage through which the second discharge passage 17 is communicated with the first drain passage 20 is set so as to be smaller than the cross-sectional area of the first communicating passage through which the second discharge passage 17 is communicated with the supply passage 14.

With this configuration, at the third position 24c of the switching valve 24, the cross-sectional area of the second communicating passage through which the second discharge passage 17 is communicated with the first drain passage 20 is set so as to be smaller than the cross-sectional area of the first communicating passage through which the second discharge passage 17 is communicated with the supply passage 14. Generally, because the pressure in the first drain passage 20 becomes lower relative to the pressure in the supply passage 14, if the cross-sectional area of the first communicating passage is set so as to be the same as the cross-sectional area of the second communicating passage at the third position 24c, most of the working oil that has been discharged from the second oil pump 11 flows into the first drain passage 20. Thus, at the third position 24c, by setting the cross-sectional area of the second communicating passage so as to be smaller than the cross-sectional area of the first communicating passage, the flow amount of the working oil flowing into the first drain passage is restricted, and at the same time, the flow amount of the working oil flowing into the supply passage 14 is ensured, and thereby, it is possible to avoid the sudden increase and decrease in the flow amount of the working oil supplied from the second oil pump 11 to the supply passage 14 when the position is switched to the third position 24c.

In addition, the valve device has: the first switching valve 124 having the first position 124a at which the second discharge passage 17 is communicated only with the supply passage 14 and the second position 124b at which the second discharge passage 17 is communicated only with the first drain passage 20; and the second switching valve 125 provided on the downstream side of the first switching valve 124, the second switching valve 125 having the first position 125a at which the second discharge passage 17 is communicated only with the supply passage 14 and the second position 125b at which the second discharge passage 17 is communicated with the supply passage 14 and the first drain passage 20, the first communication state is established when the first switching valve 124 is set at the first position 124a and the second switching valve 125 is set at the first position 125a, the second communication state is established when the first switching valve 124 is set at the second position 124b, and the third communication state is established when the first switching valve 124 is set at the first position 124a and the second switching valve 125 is set at the second position 125b, and the controller 40 is configured to switch the positions of the first switching valve 124 and the second switching valve 125 by spending the switching time such that the first communication state is switched to the second communication state or the second communication state is switched to the first communication state via the third communication state.

With this configuration, the valve device is configured of two two-position switching valves, i.e., the first switching valve 124 and the second switching valve 125. As described above, by switching the positions of the switching valves 124 and 125 by spending the switching time, it is possible to ensure the time maintained in the third communication state, in other words, a state in which the working oil that has been discharged from the second oil pump 11 can flow into the passages of both of the supply passage 14 and the first drain passage 20. By doing so, it is possible to avoid the sudden increase and decrease in the flow amount of the working oil supplied from the second oil pump 11 to the supply passage 14 when the first communication state is switched to the second communication state or when the second communication state is switched to the first communication state. In addition, by using the two-position switching valve, which has a simple configuration and which is controlled easily, as the valve device, it is possible to reduce a production cost of the working fluid supply system 200.

In addition, the another passage is the first drain passage 20 configured to return the working oil to the tank T, the working oil being discharged from the second oil pump 11, at the second position 125b of the second switching valve 125, the cross-sectional area of the second communicating passage through which the second discharge passage 17 is communicated with the first drain passage 20 is set so as to be smaller than the cross-sectional area of the first communicating passage through which the second discharge passage 17 is communicated with the supply passage 14.

With this configuration, at the second position 125b of the second switching valve 125, the cross-sectional area of the second communicating passage through which the second discharge passage 17 is communicated with the first drain passage 20 is set so as to be smaller than the cross-sectional area of the first communicating passage through which the second discharge passage 17 is communicated with the supply passage 14. Generally, because the pressure in the first drain passage 20 becomes lower relative to the pressure in the supply passage 14, if the cross-sectional area of the first communicating passage is set so as to be the same as the cross-sectional area of the second communicating passage at the second position 125b of the second switching valve 125, most of the working oil that has been discharged from the second oil pump 11 flows into the first drain passage 20. Thus, at the second position 125b, by setting the cross-sectional area of the second communicating passage so as to be smaller than the cross-sectional area of the first communicating passage, the flow amount of the working oil flowing into the first drain passage 20 is restricted, and at the same time, the flow amount of the working oil flowing into the supply passage 14 is ensured, and thereby, it is possible to avoid the sudden increase and decrease in the flow amount of the working oil supplied from the second oil pump 11 to the supply passage 14 when the position of the second switching valve 125 is switched to the second position 125b.

In addition, the valve device further has the third switching valve 126, the third switching valve 126 being provided on the downstream side of the second switching valve 125, the second switching valve 125 having the first position 126*a* at which the second discharge passage 17 is communicated only with the supply passage 14 and the second position 126*b* at which the second discharge passage 17 is communicated with the supply passage 14 and the first drain passage 20, the first communication state is established when the first switching valve 124 is set at the first position 124*a*, the second switching valve 125 is set at the first position 125*a*, and the third switching valve 126 is set at the first position 126*a*, the second communication state is established when the first switching valve 124 is set at the second position 124*b*, and the third communication state is established when the first switching valve 124 is set at the first position 124*a*, the second switching valve 125 is set at the first position 125*a* or the second position 125*b*, and the third switching valve 126 is set at the second position 126*b*, and the controller 40 is configured to switch the positions of the first switching valve 124, the second switching valve 125, and the third switching valve 126 by spending the switching time such that the first communication state is switched to the second communication state or the second communication state is switched to the first communication state via the third communication state.

With this configuration, the third switching valve 126 is further provided on the downstream side of the second switching valve 125, and the third communication state is established when the second switching valve 125 is set at the second position 125*b* and when the third switching valve 126 is set at the second position 126*b*. Thus, at the second position 125*b* of the second switching valve 125 and the second position 126*b* of the third switching valve 126, it is possible to respectively set the size of the cross-sectional area of the first communicating passage through which the second discharge passage 17 is communicated with the supply passage 14 and the size of the cross-sectional area of the second communicating passage through which the second discharge passage 17 is communicated with the first drain passage 20. By improving a degree of freedom for setting the sizes of the cross-sectional area of the first communicating passage and the cross-sectional area of the second communicating passage as described above, it becomes easier to control the flow amount of the working oil flowing into the first drain passage 20 and the flow amount of the working oil flowing into the supply passage 14, and so, it is possible to surely avoid the sudden increase and decrease in the flow amount of the working oil supplied from the second oil pump 11 to the supply passage 14 when the first communication state is switched to the second communication state or when the second communication state is switched to the first communication state.

Embodiments of the present invention were described above, but the above embodiments are merely examples of applications of the present invention, and the technical scope of the present invention is not limited to the specific constitutions of the above embodiments.

This application claims priority based on Japanese Patent Application No. 2019-220614 filed with the Japan Patent Office on Dec. 5, 2019, the entire contents of which are incorporated into this specification by reference.

The invention claimed is:

1. A working fluid supply system configured to supply working fluid to a fluid apparatus, the working fluid supply system comprising:
a first pump and a second pump driven by output from a common driving source, the first pump and the second pump being capable of supplying working fluid to the fluid apparatus through a supply passage;
a valve device configured to cause a discharge passage of the second pump to communicate with at least one of the supply passage and another passage different from the supply passage; and
a control unit configured to change a communication state of the valve device in accordance with a required flow amount of the working fluid required by the fluid apparatus, wherein
the valve device has: a first communication state at which the discharge passage is communicated only with the supply passage; a second communication state at which the discharge passage is communicated only with the another passage; and a third communication state at which the discharge passage is communicated with the supply passage and the another passage while the first communication state is shifted to the second communication state or while the second communication state is shifted to the first communication state, and
the control unit is:
configured to set switching time for switching the communication state of the valve device in accordance with a degree of a pressure variation predicted to be caused in the supply passage when the communication state of the valve device is switched instantaneously from the first communication state to the second communication state or from the second communication state to the first communication state; and
configured to switch the communication state of the valve device from the first communication state to the second communication state or from the second communication state to the first communication state via the third communication state by spending the set switching time.

2. The working fluid supply system according to claim 1, wherein
the control unit has:
a discharge flow amount calculating unit configured to calculate a first discharge flow amount of the working fluid discharged from the first pump and a second discharge flow amount of the working fluid discharged from the second pump;
a pressure variation prediction unit configured to predict variation of pressure caused in the supply passage based on the first discharge flow amount and the second discharge flow amount; and
a switching time setting unit configured to set the switching time in accordance with the variation of the pressure predicted by the pressure variation prediction unit, wherein
as the discharged amount of the second pump is increased, the pressure variation is predicted to be increased, and the switching time is set so as to be longer.

3. The working fluid supply system according to claim 1, wherein
the valve device is a switching valve having: a first position at which the first communication state is achieved; a second position at which the second communication state is achieve; and a third position at which the third communication state is achieved between the first position and the second position, and
the control unit is configured to switch the position of the switching valve by spending the switching time such that the first communication state is switched to the second communication state or the second communication state is switched to the first communication state via the third communication state.

4. The working fluid supply system according to claim 3, wherein
the another passage is a drain passage configured to return the working fluid to a tank, the working fluid being discharged from the second pump, and
at the third position, a cross-sectional area of a second communicating passage through which the discharge passage is communicated with the another passage is set so as to be smaller than a cross-sectional area of a first communicating passage through which the discharge passage is communicated with the supply passage.

5. The working fluid supply system according to claim 1, wherein
the valve device has:
a first switching valve having a first position at which the discharge passage is communicated only with the supply passage and a second position at which the discharge passage is communicated only with the another passage; and
a second switching valve provided on a downstream side of the first switching valve, the second switching valve having a first position at which the discharge passage is communicated only with the supply passage and a second position at which the discharge passage is communicated with the supply passage and the another passage,
the first communication state is established when the first switching valve is set at the first position and the second switching valve is set at the first position, the second communication state is established when the first switching valve is set at the second position, and the third communication state is established when the first switching valve is set at the first position and the second switching valve is set at the second position, and
the control unit is configured to switch positions of the first switching valve and the second switching valve by spending the switching time such that the first communication state is switched to the second communication state or the second communication state is switched to the first communication state via the third communication state.

6. The working fluid supply system according to claim 5, wherein
the another passage is the drain passage configured to return the working fluid to the tank, the working fluid being discharged from the second pump, and
at the second position of the second switching valve, the cross-sectional area of the second communicating passage through which the discharge passage is communicated with the another passage is set so as to be smaller than the cross-sectional area of the first communicating passage through which the discharge passage is communicated with the supply passage.

7. The working fluid supply system according to claim 5, wherein
the valve device further has a third switching valve, the third switching valve being provided on a downstream side of the second switching valve, and the third switching valve having a first position at which the discharge passage is communicated only with the supply passage and a second position at which the discharge passage is communicated with the supply passage and the another passage,
the first communication state is established when the first switching valve is set at the first position, the second switching valve is set at the first position, and the third switching valve is set at the first position, the second communication state is established when the first switching valve is set at the second position, and the third communication state is established when the first switching valve is set at the first position, the second switching valve is set at the first position or the second position, and the third switching valve is set at the second position, and
the control unit is configured to switch positions of the first switching valve, the second switching valve, and the third switching valve by spending the switching time such that the first communication state is switched to the second communication state or the second communication state is switched to the first communication state via the third communication state.

* * * * *